July 30, 1968 G. W. BAUGHMAN 3,395,275
VEHICLE VELOCITY RATE OF CHANGE CONTROL SYSTEM
Filed April 1, 1966 3 Sheets-Sheet 1

INVENTOR
George W. Baughman.
BY W. L. Stout.
HIS ATTORNEY

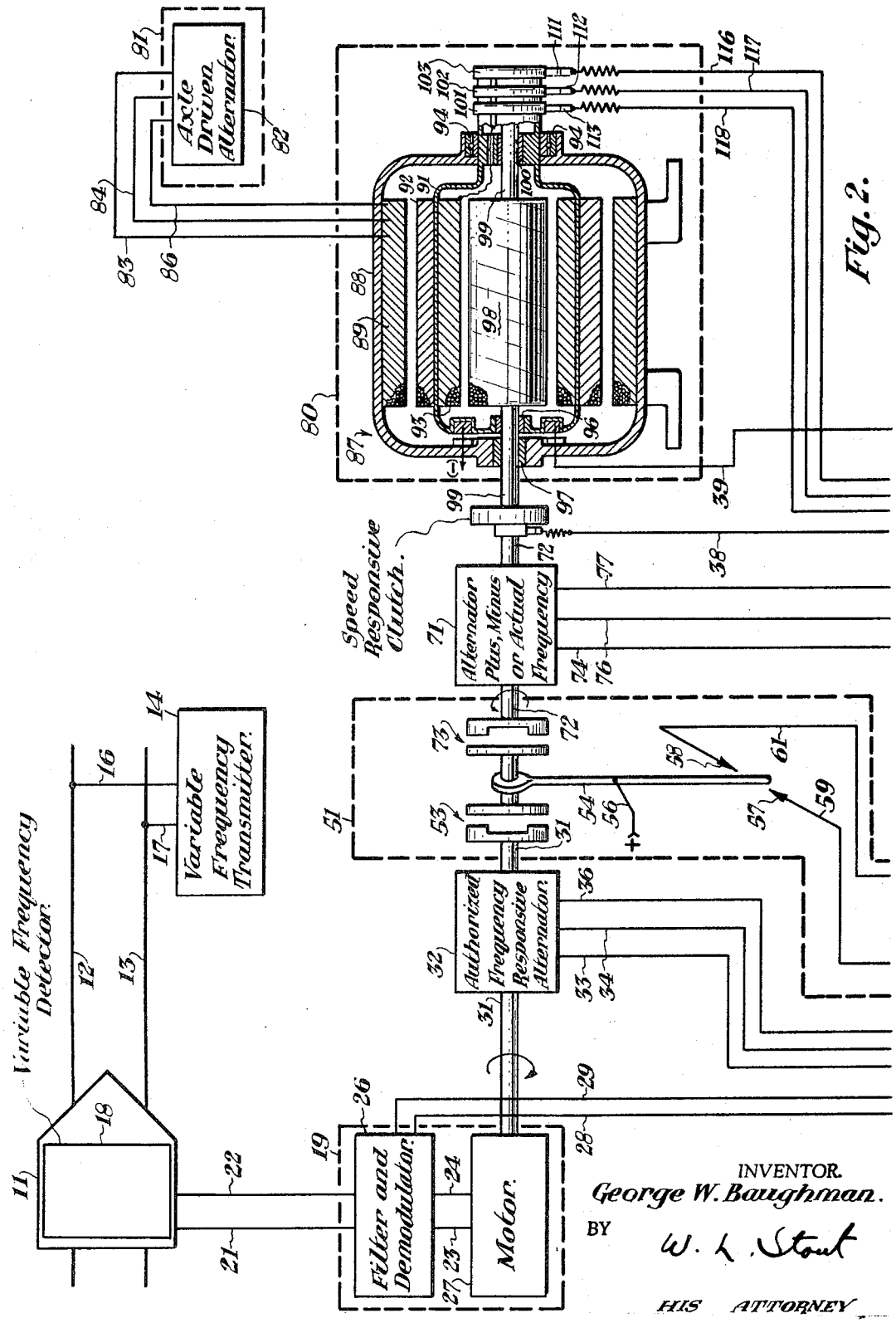

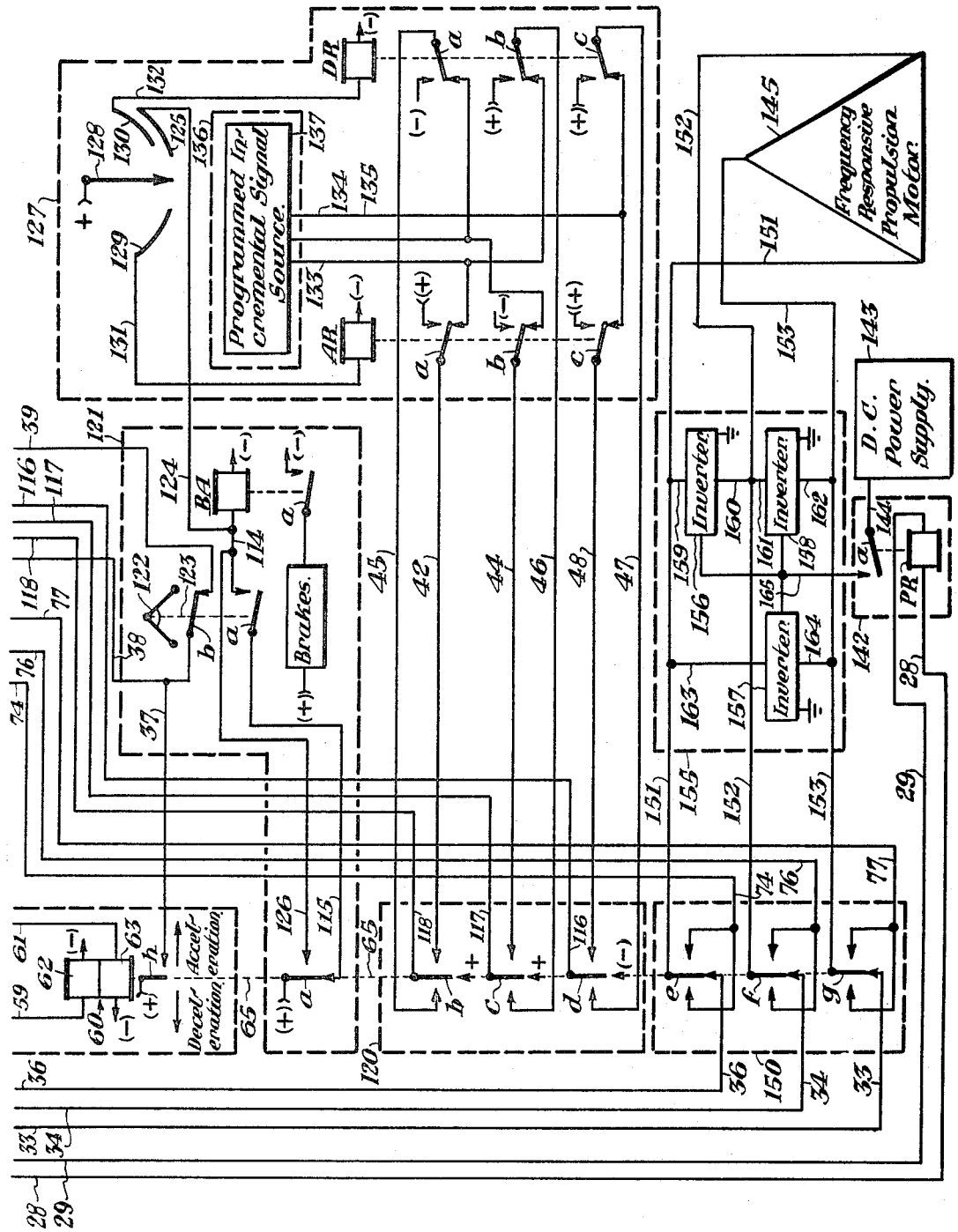

United States Patent Office 3,395,275
Patented July 30, 1968

3,395,275
VEHICLE VELOCITY RATE OF CHANGE CONTROL SYSTEM
George W. Baughman, Swissvale, Pa., assignor to Westinghouse Air Brake Company, Swissvale, Pa., a corporation of Pennsylvania
Filed Apr. 1, 1966, Ser. No. 539,350
27 Claims. (Cl. 246—187)

ABSTRACT OF THE DISCLOSURE

This invention relates to a vehicle propulsion system wherein a vehicle operating within the system has its velocity controlled as a combined function of an authorized speed command signal and a programmed velocity rate of change signal. The programmed velocity rate of change signal is controlled by vehicle-carried apparatus that measures the actual rate at which the vehicle's propulsion system is causing the vehicle to respond to the authorized speed command signal. The apparatus just noted provides a velocity rate of change signal which will add to, subtract from, or maintain the actual rate at which the vehicle is responding to the authorized speed command signal. The programmed velocity rate of change signal has a value which is consistent with vehicle safety, roadway conditions and passenger comfort.

---

Figure 1:
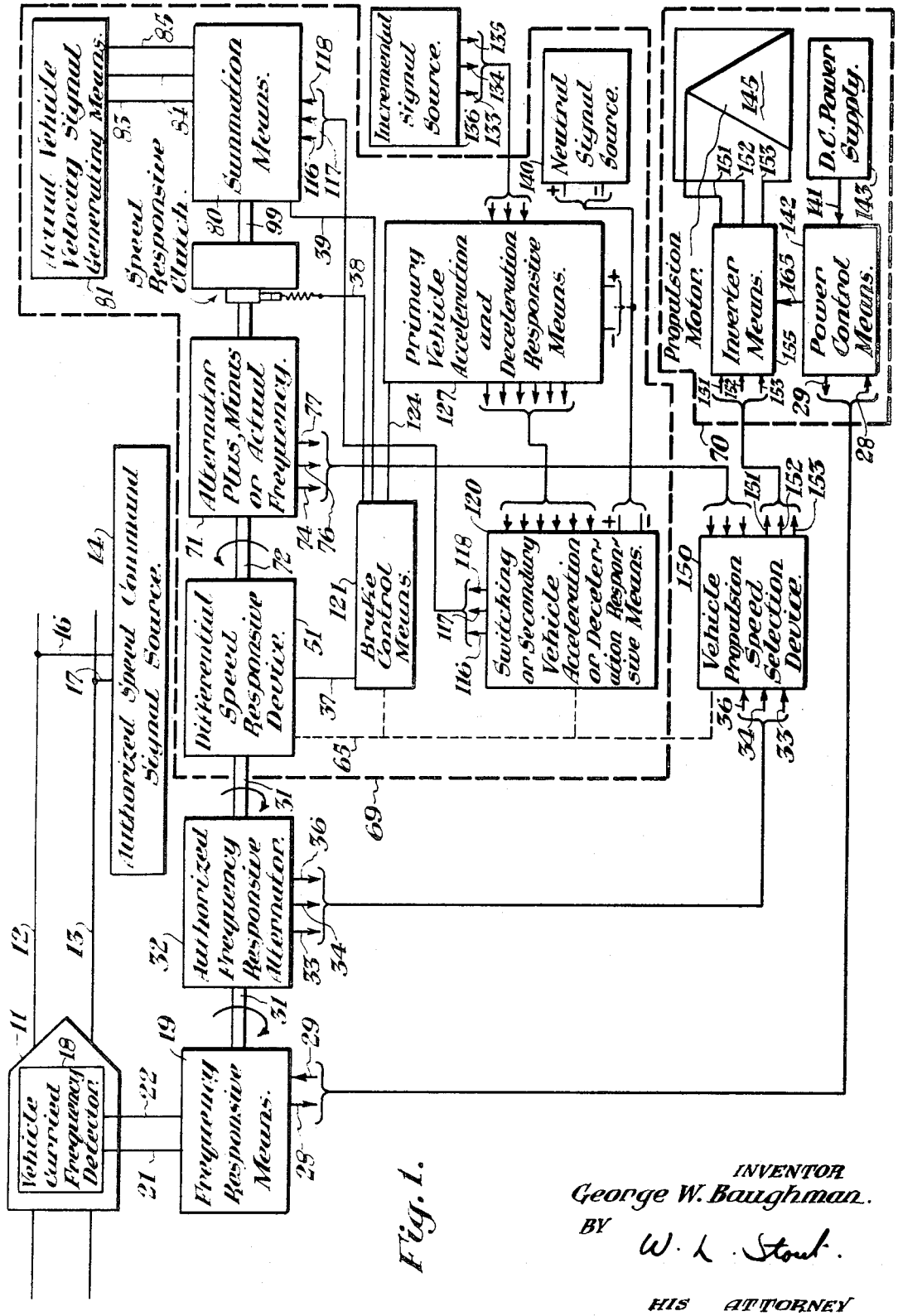

This invention relates to a vehicle propulsion velocity rate of change control system.

More specifically this invention relates to a vehicle propulsion system wherein a vehicle operating within the system has its velocity controlled as a combined function of an authorized speed command signal and a programmed velocity rate of change signal. The programmed velocity rate of change signal is controlled by vehicle-carried apparatus that measures the actual rate at which the vehicle's propulsion system is causing the vehicle to respond to the authorized speed command signal. The apparatus just noted provides a velocity rate of change signal which will add to, subtract from, or maintain the actual rate at which the vehicle is responding to the authorized speed command signal. The programmed velocity rate of change signal has a value which is consistent with vehicle safety, roadway conditions and passenger comfort.

The mushrooming megalopolises of the world are today threatening to choke the very communities that have given them their existence. No longer will transportation systems that operate an old fashioned time tables meet the needs of a burgeoning society that must be moved en masse within the cities in vehicles that must pursue headways that are measured in seconds. Vehicle traffic control whether effected by movable block, zone control, or other approach, must ultimately concern itself with the optimization of accelerating and decelerating vehicles within the system. At all times passenger comfort and safety, as well as maximum traction or braking where drive wheels are employed, must be considered. In order that acceleration be smooth vehicle speed command signals must be programmed to afford maximum permissible acceleration either by wayside control, central control, or a control system which functionally includes other vehicles, in the system. Smooth acceleration or deceleration control may be obtained by the incorporation of increasingly sophisticated wayside, central, or vehicle interrelated control systems, but the cost for these sophisticated systems may become prohibitive. The invention to be described provides an answer to all these noted problems and the invention may be readily incorporated in all vehicle propulsion systems, to either enhance an existing system's capacity to optimize its acceleration and deceleration ability, or vastly reduce the cost of wayside and centralized vehicle control by the incorporation of the invention within the vehicle propulsion system. The currently increasing demand for high speed, close headway, rapid transit systems makes improvements that result in advances to overall system performance measured in seconds and fractions of seconds, in fact the subject of a significant advance in the art, The magnitude of the problem involved is more readily appreciated when the variable parameters such as vehicle size and weight, weather conditions, passenger load and roadway conditions are considered in a dynamically changing environment. The invention to be described provides the answer to this intricate and vexing set of technical obstacles.

It should be recognized that while the invention is to be described in a railway environment, the propulsion control system embodying the invention is equally applicable to all modes of transportation where smooth, efficient acceleration and deceleration must be maintained.

It is therefore an object of this invention to provide a velocity rate of change control system that provides optimum acceleration and deceleration consistent with passenger safety and comfort.

Another object of this invention is to provide a velocity rate of change control system that provides optimum acceleration and deceleration consistent with freight stability and freedom from lading damage where cargo carrying vehicles are employed.

It is a further object of this invention to provide a velocity rate of change control system that utilizes the greatest practical percentage of wheel to roadway traction where wheels are employed to provide the vehicle's tractive effort.

Another object of this invention is the provision of a vehicle-carried velocity rate of change control system that takes automatically into account the rate at which the vehicle is responding to an authorized speed command signal.

Still another object of this invention is the provision of a programmed velocity rate of change signal that will control the application of propulsion effort in a smoothly variable manner resulting in a highly economical vehicle propulsion control system which may be adapted to a wide range of propulsion systems..

In the attainment of the foregoing objects a vehicle propulsion velocity rate of change control system is provided in which the ultimate control of the vehicle's speed is a combined function of an authorized speed command signal and the rate at which the vehicle is responding to the authorized speed command signal. The system basically includes a differential speed responsive device having an output and at least one input thereto which is a direct function of the authorized speed command signal. There is provided a primary vehicle velocity rate of change responsive unit and a secondary vehicle velocity rate of change responsive unit. The primary vehicle velocity rate of change responsive unit includes an inertia responsive mechanism which assumes a series of positions dependent upon whether the vehicle is accelerating, decelerating, or traveling at a constant velocity. The secondary vehicle velocity rate of change responsive unit is controlled by the output from the differential speed responsive device aforementioned. An actual vehicle velocity signal generating unit provides an actual vehicle velocity signal to a summation device, which summation device will be referred to in more detail hereafter. Of special significance is an incremental signal source controlled by the output from the primary vehicle velocity rate of change responsive unit. The incremental signal source is electrically connected to the secondary vehicle velocity rate of change responsive unit. The incremental signal source has a programmed incremental value of a positive nature where acceleration is required and of a negative nature where deceleration is required. The programmed incremental signal is controlled by the position of the inertia responsive mechanism so that whenever the rate of change of velocity exceeds either a predetermined acceleration rate or deceleration rate, respectively, the positive or negative incremental signal to the secondary vehicle velocity rate of change responsive unit is interrupted.

A neutral signal source is also provided which is controlled by the output from the primary vehicle velocity rate of change responsive unit. The neutral signal source is electrically connected to the secondary vehicle velocity rate of change responsive unit. The output from the primary velocity rate of change responsive unit which controls the neutral signal source effects this control as a result of the position assumed by the inertia responsive means and accordingly provides the neutral signal to the secondary vehicle velocity rate of change responsive unit whenever the acceleration or deceleration has exceeded the predetermined acceleration or deceleration rate aforementioned.

The secondary vehicle velocity rate of change responsive unit essentially controls the application of the programmed incremental signal or the neutral signal to the summation device. The summation device has an output which is indicative of the algebraic sum of the actual vehicle velocity signal input and the incremental signal or neutral signal input. The differential speed responsive device has an output which is a function of the authorized speed command signal and the output from the summation device.

The final major component positioned in the control system before the vehicle's propulsion motor is a propulsion motor speed selection mechanism which is controlled by the output of the differential speed responsive device. The speed selection mechanism has an output to the propulsion motor which is a function of either the authorized speed command signal or the output from the summation device.

Other objects and advantages of the present invention will become apparent from the ensuing description of illustrative embodiments thereof, in the course of which reference is had to the accompanying drawings in which:

FIG. 1 illustrates in block diagram form an embodiment of the vehicle propulsion velocity rate of change control system of the invention.

FIGS. 2 and 3, taken together with FIG. 2 above FIG. 3, are a circuit diagram of the system set forth in FIG. 1.

A description of the above embodiment will follow and then the novel features of the invention will be presented in the appended claims.

Reference is now made to FIG. 1 which depicts in block diagram form a system embodying the invention described hereafter. This block diagram takes a general form in that it does not set forth specific circuitry essential to the carrying out of a preferred form of the invention. To the degree that this diagram is indicative of a specific system, the invention will be described in a railway environment, where the immediate problems, namely, mass transit as it is known today, will be explained and the solution therefore will become evident as the description of the invention ensues.

FIG. 1 depicts a train or vehicle 11, shown schematically in the upper left-hand portion of this figure, positioned on a pair of rails 12 and 13. Train 11 is proceeding from left to right in this figure and is approaching a point at the right-hand end of the rails 12 and 13 at which an authorized speed command signal source 14 is delivering a signal to the rails 12 and 13 via electrical leads 16 and 17. The precise manner and the nature of this command signal source and its application of a signal to the rails is explained in detail in my copending application for Letters Patent of the United States, Ser. No. 492,008, filed Oct. 1, 1965, for a Train Speed Control System. All that will be said with regard to this type of authorized speed command signal source 14 is that this speed command signal source will deliver a continuously variable frequency signal to the train 11. In this case the signal will be transmitted via the rails 12 and 13 where it will be inductively received by coils, not shown in this figure, on the train. These coils that receive the signal have been generally designated as a vehicle-carried frequency detector 18 shown enclosed within the train 11. The remaining train-carried equipment to be described hereafter is depicted beneath the train 11 and fills out the rest of this figure. From this point forward the term "train" will be used interchangeably with the term "vehicle" in order that the broad nature of this invention may be more readily comprehended irrespective of the specific contribution to the train and railway arts.

Therefore, beneath the vehicle 11 and electrically connected to the vehicle-carried frequency detector 18 is a frequency responsive means 19 connected via leads 21 and 22. This frequency responsive means receives signals that have been detected by the vehicle-carried frequency detector and in turn produces an output in the form of a mechanical output in shaft 31 emanating to the right of the frequency responsive means 19. The rotary output from frequency responsive means 19 bears a direct relationship to the authorized speed command signal delivered by the authorized speed command signal source 14. A pair of leads 28 and 29 which originate in the frequency responsive means 19 have a signal present thereon whenever an authorized speed command signal is present in the rails, or is actually received by the vehicle. The function of the presence of a signal on leads 28 and 29 will of course be appreciated more fully when the description with reference to FIGS. 2 and 3 is made. At this point it need only be recognized that whenever a signal is present in the rails 12 and 13 there will also appear a signal in the leads 28 and 29.

Proceeding now with the description of the physical layout of this system. The output shaft 31 of the frequency responsive means 19 enters an authorized frequency responsive alternator 32. This alternator may be of the conventional type and one of those types which would provide a multiphase output. This multiphase output would appear in electrical leads 33, 34 and 36. Since the alternator is driven by the shaft 31 which in turn is rotating at a speed proportional to the authorized speed command signal source, the alternator will have an electrical output on these leads 33, 34 and 36 which is indicative of the authorized speed command signal. This electrical signal that appears on these leads 33, 34 and 36 is delivered at all times to a vehicle propulsion speed selection device 150 where this authorized speed command signal may ultimately be delivered via leads 151, 152 and 153 to a vehicle propulsion means 70. The vehicle propulsion means in this figure is shown in dotted outline and includes an inverter means 155 and a power control means 142 which delivers a direct current signal via the electrical lead 165 to the inverter means 155. The direct current power control means 142 in turn is supplied by direct current power supply 143 via the electrical lead 141. The propulsion motor 145 depicted schematically here is of the same type described in great detail in my copending application Ser. No. 492,008, above referred to. This propulsion motor 145 has power supplied to it via the electrical leads 151, 152 and 153. A detailed explanation of the function of this motor and its response to a variable frequency signal delivered thereto will be made in greater detail hereafter. At this point in the description it need only be recognized that the propulsion means 70, shown here in dotted outline, includes in this particular description a propulsion motor whose outlet speed is directly a function of the frequency of a signal delivered to the propulsion means via a vehicle propulsion speed selection device 150.

While this embodiment of the invention depicts an electric propulsion motor, the invention is intended to contemplate as within its scope the provision of any kind of propulsion motor. A basic requirement of course is that the propulsion motor may have its speed varied as a direct function of a variable authorized speed command signal delivered to the vehicle.

Returning now to the authorized frequency responsive alternator 32. Emanating from the right of this authorized frequency responsive alternator 32 is the shaft 31 which is a continuation of the shaft 31 which was being driven by the frequency responsive means 19. This shaft 31 enters the dotted outlined section of the control system referred to here as a means 69 that measures the actual rate at which the vehicle is responding to the authorized speed command signal. Keeping this general function in mind, a description will now be made of the various components and units that make up this means 69 which measures the actual rate at which the vehicle is responding to the authorized speed command signal.

The shaft 31 enters one side of a differential speed responsive device 51. This differential speed responsive device 51 will have an output 65 which is indicative of the combined effect of an authorized speed command signal, which is reflected in the rotary motion of the input shaft 31, and on the other hand the differential speed responsive device 51 will receive a second input from shaft 72, which shaft 72 is driven by a summation means 80 depicted to the right of this figure. This summation means 80, whose function will be described more fully hereafter, provides a rotary output via the shaft 99, a speed responsive clutch, and thence the shaft 72 which enters an alternator 71 which alternator has the shaft 72 passing therethrough and into one side of the differential speed responsive device 51. The control of the summation means 80 and the output from the alternator 71 will now be explained and the manner in which they cooperate with the differential speed responsive device 51 will be covered at this time.

As has been earlier noted, the differential speed responsive device 51 has an output which is the combined function of the authorized speed command signal and a summation means output. This output 65 from the differential speed responsive device 51 has a direct control over a unit referred to as brake control means 121 and a simultaneous control over a switching or secondary vehicle acceleration or deceleration responsive means 120. Directly beneath this last-mentioned means is a vehicle propulsion speed selection device 150, noted earlier. This vehicle propulsion speed selection device 150 is also controlled directly by the output from the differential speed responsive device 51. The vehicle propulsion speed selection device 150 will provide a selection of an authorized speed command signal delivered via the electrical leads 33, 34 and 36 from the authorized frequency responsive alternator 32 or a signal from alternator 71 driven by the shaft 72 from the summation means 80. The alternator 71 has an output delivered over the electrical leads 74, 76 and 77 to the vehicle speed selection device 150. It will be seen without going further into the description of the variable nature of the signal that will be delivered from the alternator 71 via the leads 74, 76 and 77 that the vehicle propulsion speed selection device 150 will select, on the one hand the authorized speed command signal or a signal from the alternator 71. At this point it will be stated that the alternator 71 will have a variable frequency output that is plus, minus, or represents the actual velocity at which the train is traveling. This needs further explanation.

Depicted in the upper right-hand corner of this figure is an actual vehicle velocity signal generating means 81 and in this particular description of the invention this actual vehicle velocity signal generating means 81 is in fact an axle driven alternator which delivers an output via the leads 83, 84 and 85 to the summation means 80 and this multiphase variable frequency signal output that appears on the electrical leads 83, 84 and 85 will always be indicative of and directly proportional to the actual speed at which the vehicle is traveling. In other words, a signal delivered by the actual vehicle velocity signal generating means 81 is a reference signal which ultimately will be used as a reference to allow the determination of whether or not the vehicle 11 is accelerating to the authorized speed at a rate which is going to afford the maximum acceleration, or deceleration as the case may be, consistent with passenger safety and comfort. Where the system is applied to freight transportation the acceleration or deceleration must be consistent with maximum safety for the cargo carried by the freight carrier.

Returning now to the summation means 80. As has been noted, it received an input via the electrical leads 83, 84 and 85. Directly beneath the summation means 80 are a set of electrical leads 116, 117 and 118. A tracing of these leads to their origin reveals that they emanate from the switching or secondary vehicle acceleration and deceleration responsive means 120 which, as has been noted, is controlled by the output 65 from the differential speed responsive device 51. To the right of and slightly above the switching or secondary vehicle acceleration and deceleration responsive means 120 is what has been designated as a primary vehicle acceleration and deceleration responsive means 127. This primary vehicle acceleration and deceleration responsive means 127 provides the important function of ascertaining the rate at which a vehicle is responding to the authorized speed command signal. At this moment a brief look will be made into the nature and origin of the authorized speed command signal.

In those systems where the authorized speed command signal source is of a variable nature and the vehicle 11 is required to respond to the authorized speed command signal there is an inherent danger that the authorized speed command signal will, when traffic conditions permit, deliver to the vehicle 11, for example, a full speed ahead signal. This full speed ahead signal, while consistent with traffic safety, might well cause vehicle 11 to respond rapidly to the authorized speed command signal; in other words, accelerate at a very rapid rate. In the event that the load was heavy on the train this could well produce a loss of tractive effort from the vehicle's wheels. On the other hand, should the vehicle be one which is driven by a propulsion unit which does not require a tractive effort between the vehicle and ground, the acceleration called for by the authorized speed command signal might be one that would be excessive in regard to passenger comfort. Also, the acceleration may be too great for freight being transported by a vehicle receiving such a full speed ahead command. One answer to this problem would be to program the authorized speed command signal to be representative of the maximum permissible acceleration or deceleration at which the vehicle would have to perform in order to meet the goals of safety and comfort. The cost of programming the signal at the wayside can become prohibitive, especially when each vehicle that operates within the system may be of a different size, a different weight, and have to be operated in varying climatic conditions which produce changes in roadway conditions. This invention, as will be seen immediately hereafter, takes into account the need for the vehicle propulsion system to comprehend the rate at which the vehicle is responding to the authorized speed command signal and then provide a signal to the propulsion means of the vehicle which will optimize acceleration or deceleration consistent with safety and comfort as aforementioned. This is accomplished in part by the unit described earlier as a primary vehicle acceleration and deceleration responsive means 127. This primary vehicle acceleration and deceleration responsive means 127 includes an inertia responsive element which assumes a series of positions dependent upon whether the vehicle is accelerating, decelerating, or traveling at a constant velocity. Therefore, one can appreciate that the primary vehicle acceleration and deceleration responsive means 127 inherently will take into account the load of the train or vehicle, because the lighter the load, the more rapidly the vehicle will accelerate and of course there will be a concomitant change in position of the inertia responsive element in response to this more rapid acceleration. A heavier load will cause a slower acceleration and in turn the inertia responsive element will assume a position which will reflect the fact that the vehicle in fact has a greater load. This ability to determine the rate at which the vehicle is accelerating or decelerating is combined with the next feature of the system to be described.

Depicted to the right of the primary vehicle acceleration and deceleration responsive means 127 is an incremental signal source 136. This incremental signal source 136 has therein a signal generator which produces a signal which will provide a frequency increment of a preselected nature to the signal in that it will provide a positive frequency increment or a negative frequency increment to the electrical leads 133, 134 and 135 through the primary vehicle acceleration and deceleration responsive means 127. The positive nature of this incremental frequency signal delivered from the incremental signal source 136 will be utilized when acceleration is called for. The negative nature of the incremental frequency signal delivered from the incremental signal source 136 will be utilized when deceleration is needed. The precise value of this incremental signal will of course be determined by tests and experiment which will be made in conjunction with the type of propulsion system involved and the roadway encountered. This incremental signal source 136 may be programmed to provide an output over the leads 133, 134 and 135 which will reflect the type of vehicle, the type of cargo, i.e. passenger or freight, and the road conditions involved. As has been noted, the primary vehicle acceleration and deceleration responsive means 127 includes an inertia responsive unit, not shown in this figure, which assumes a series of positions and it is this positioning which will select either a positive incremental signal where acceleration is called for, or a negative incremental signal in the event that deceleration is called for. One other condition arises and that is where neither a need to accelerate nor a need to decelerate is present. In other words, a situation where the authorized speed of the vehicle and the actual speed of the vehicle are approximately equal. In this situation the vehicle will be traveling at a constant velocity, the vehicle having attained the authorized speed. In these circumstances there will be applied a neutral or direct current signal, as it may be termed, from a neutral signal source 140 depicted to the right of the primary vehicle acceleration and deceleration responsive means 127. This neutral signal source 140 will be brought into effect when the vehicle has exceeded a predetermined acceleration or deceleration rate. The neutral signal source will also be employed within the system when the vehicle is traveling at a speed which is approximately equal to the authorized speed command signal delivered to the vehicle. Accordingly, the output from the switching or secondary vehicle acceleration and deceleration responsive means 120, which output appears on the electrical leads 116, 117 and 118, will be delivered to the summation means 80.

To recapitulate briefly, the summation means 80 is always receiving a signal from the actual vehicle velocity signal generating means 81 via the electrical leads 83, 84 and 85. At the base of the summation means 80 are electrical leads 116, 117 and 118 which are delivering a signal from switching or secondary vehicle acceleration and deceleration responsive means 120 The nature of the signal present on the electrical leads 116, 117 and 118 will be determined by whether or not the vehicle is traveling at the authorized speed command, less than the authorized speed command, or greater than the authorized speed command. Therefore, the switching or secondary vehicle acceleration and deceleration responsive means 120 will take the output from the primary vehicle acceleration and deceleration responsive means 127 or the neutral signal source 140 and deliver either an incremental signal of positive or negative nature, or neutral nature to the summation means 80. The summation means 80, the precise construction of which will be explained in detail with reference to FIGS. 2 and 3, will take these various imports and provide a rotary output via the shaft 99 which is indicative of the algebraic sum of the input to the summation means 80. Since the summation means 80 always receives a signal from the actual vehicle velocity signal generating means 81, and this signal from the actual vehicle velocity signal generating means 81 is indicative of the actual speed of the vehicle, it will be appreciated that the algebraic sum of the output which appears on the shaft 99 will be reflective of the following possible functions dependent upon the nature of the incremental or neutral signal being delivered to the summation means 80 from the switching or secondary vehicle acceleration and deceleration responsive means 120.

In the event that a positive incremental signal is being delivered from the incremental signal source 136 through the primary vehicle acceleration and deceleration responsive means 127 and finally the switching or secondary vehicle acceleration and deceleration responsive means 120, this positive signal in turn being delivered via the electrical leads 116, 117 and 118 to the summation means 80, the summation means 80 in this instance will add the positive increment just noted to the signal which bears a frequency which is a direct function of the actual speed of the vehicle. Therefore, the output 99 will have a rotational value which is of a small increment larger than the actual speed at which the vehicle is traveling. This summed output including this positive increment will be delivered through the speed responsive clutch to the left of shaft 99, the shaft 72, to the alternator 71. This alternator 71 will in this instance produce a signal via its output leads 74, 76 and 77 which is a direct function of the summed signal received by the summation means 80. In this particular situation being described, the alternator outputs 74, 76 and 77 of the alternator 71 will be of a slightly greater value in frequency than the frequency which is representative of the actual speed at which the vehicle is traveling. This condition hereafter will be referred to as an alternator having a plus frequency and this output via the leads 74, 76 and 77 is delivered to the vehicle propulsion speed selection device 150 where if the vehicle has not arrived at the actual speed commanded, the vehicle propulsion speed selection device 150 will permit the passage of this plus frequency from the alternator 71 through to the propulsion means 70 where this signal which bears the positive incremental signal from source 136 and the actual vehicle velocity will cause the propulsion motor 145 to respond in an accelerating manner.

It should be recognized, of course, that the incremental signal of a positive nature when applied through the primary vehicle acceleration and deceleration responsive means 127 and eventually to the summation means 80 may cause the vehicle, even though it is of a small incremental nature, to exceed the maximum desired acceleration for which this system is designed. In this situation the primary vehicle acceleration and deceleration responsive means 127 would reflect this rate of acceleration by the position of the inertia responsive member therein and interrupt the delivery of the positive natured incremental signal from the incremental signal source 136, and in so doing apply a neutral signal from the neutral signal source 140 through the switching or secondary acceleration and deceleration responsive means 120 to the summation means 80. In the situation where the acceleration brought about by the addition of the positive increment exceeded a predetermined rate the summation means 80 would of course receive then a neutral signal over the electrical leads 116, 117 and 118. The presence of the neutral signal on the summation means 80 would cause the shaft 99 of the summation means 80 to rotate at a speed directly proportional to the actual vehicle velocity, and in the event that the acceleration was too great this would reduce the rotary output value of the shaft 99 which would result in a concomitant reduction in the frequency being delivered by the alternator 71 via leads 74, 76 and 77.

In the event that the vehicle had not attained the speed commanded by the authorized speed command signal, the differential speed responsive device 51, which has an input from the shaft 31, as well as the shaft 72, would have an output which would reflect the fact that the actual speed of the vehicle had not attained the authorized speed commanded. Therefore, this differential speed responsive device 51 would maintain its recognition of the fact that the vehicle still had to increase its ultimate speed in order to attain the authorized speed commanded. This constant recognition of the fact of whether or not the vehicle has reached the authorized speed will be manifested at all times in its output 65.

Recapitulating briefly, we have just reviewed the situation where an acceleration is essential to bring the vehicle up to the authorized speed and the differential speed responsive device 51 has recognized the fact that the vehicle has not attained the desired authorized speed command signal, and the addition of the positive incremental signal via the summation means 80 and the alternator 71 has caused the vehicle to accelerate at a rate which exceeds that which is consistent with safety and passenger comfort. At this point the neutral signal has been applied and the signal that is delivered by the vehicle propulsion speed selection device 150 will be a signal which is directly proportional to the actual vehicle velocity which of course will be of a frequency less than the summed signal that had been delivered just moments before to the propulsion motor 145 via the inverter 155. Therefore, the vehicle would still be recognizing its need to accelerate, and in the event that the increment of acceleration being provided by incremental signal source 136 caused an acceleration in excess of a predetermined rate, the frequency delivered to the propulsion motor would be decreased to a frequency which would be directly proportional to the actual vehicle velocity.

In the event, of course, that the nature of the load of the vehicle was such that the addition of the positive incremental signal from the incremental source 136 through the primary vehicle acceleration and deceleration responsive means 127, the switching or secondary vehicle acceleration and deceleration responsive means 120, to the summation means 80, which causes the alternator 71 to produce an output which is a function of the sum of the actual vehicle speed plus the incremental frequency being added to cause the vehicle to accelerate and this acceleration does not exceed the predetermined value, the vehicle will continue under the influence of this summed signal of a plus nature until the vehicle's actual speed and the command speed are approximately equal. When the command speed and the vehicle actual speed are equal, the differential speed responsive device 51 will have an output which is indicative of this and then the authorized speed command signal being delivered by the authorized frequency responsive alternator 32 will control, via the speed selection means 150, the propulsion means 70 and its related propulsion motor 145.

It will be appreciated that should the authorized speed command signal be reduced so that the signal received by the vehicle 11 was, say for example, at some value less than full speed ahead, this decreased authorized speed command signal would be reflected in the output from the frequency responsive means 19, the authorized frequency responsive alternator 32, and of course the rotary shaft 31 input to the differential speed responsive device 51. This new authorized speed command signal, in a manner to be described hereafter, will produce in the output 65 of the differential speed responsive device 51 an output which is indicative of a need for the vehicle to decelerate to attain the newly desired authorized speed, and at this point the use of a negative incremental signal, mentioned earlier, will be employed.

Just as in the case where the vehicle was being accelerated and a positive increment was delivered through a series of means to the summation means to cause the vehicle to accelerate, whenever the vehicle must decelerate in order to reach a lower authorized speed command signal, then the negative incremental frequency will be called upon to bring about the reduction in vehicle speed consistent with passenger safety and comfort. We, therefore, see that the differential speed responsive device plays the important role of establishing for the system a recognition of whether or not the vehicle is in a mode of operation which requires acceleration to reach the authorized speed command signal, or on the other hand is in a mode of operation which requires the vehicle and its propulsion system to reduce its speed to attain the authorized speed command signal.

When a reduction in speed is indicated necessary by the output 65 from the differential speed responsive device 51, then the negative incremental signal will be employed by the primary vehicle acceleration and deceleration responsive means 127, and this negative incremental signal will be passed by the switching or secondary vehicle acceleration and deceleration responsive means 120 to be delivered to the summation means 80 via the electrical leads 116, 117 and 118. In the summation means 80 there will be an algebraic summing of the signals delivered thereto and since the summation means is always receiving a signal via the electrical leads 83, 84 and 85, which is indicative of the actual vehicle velocity, this negative incremental signal delivered from the incremental signal source 136 will subtract from the frequency of the signal delivered from the actual vehicle velocity signal generating means 81 and produce a concomitant output in the output shaft 99 which reflects a signal whose frequency is less than a comparable actual vehicle velocity signal frequency. This output from the summation means 80 will control the alternator 71 and it therefore follows that the alternator output on the electrical leads 74, 76 and 77 will bear a total value which is an increment less in frequency than a variable frequency signal indicative of the actual vehicle velocity. This signal on the electrical leads 74, 76 and 77 will be applied via the vehicle propulsion speed selection device 150 and this signal will then be applied to the propulsion means 70. It will therefore be seen that since the value of the signal is of an increment less than the actual speed of the vehicle, the propulsion means 70 and its related propulsion motor 145 will be commanded to drive the vehicle at a lower speed, and of course to the extent that the vehicle is by its very inertia being driven at a greater rate of speed there will appear electrical braking which takes place within the propulsion system where an electric propulsion motor is involved. This may be utilized to reduce the speed of the vehicle without the necessity for applying the brakes of the vehicle unless a series of special circumstances described hereafter arise.

Accordingly, if the deceleration brought about by the algebraic addition of the actual vehicle velocity signal and the negative incremental signal is greater than a predetermined value, the primary vehicle acceleration and deceleration responsive means 127 will recognize this by the inertia responsive element within the primary vehicle acceleration and deceleration responsive means 127 assuming its position which will bring about the interruption of the delivery of the negative incremental signal from the incremental signal source 136. This interruption of the negative incremental signal will be simultaneously joined by the application of a neutral signal from the neutral signal source 140. This neutral signal will be passed through the switching or secondary vehicle acceleration and deceleration responsive means 120 through to the summation means 80 via the electrical leads 116, 117 and 118. In this situation where the neutral signal is applied, the summation means 80 will only see a signal which is indicative of the actual speed of the vehicle, and this signal will be delivered over the leads 83, 84 and 85 which results in the summation means 80 having its output 99 driven at a rate which is a direct function of the actual speed of the vehicle, which of course is going to be reflected in an alternator output of alternator 71 via leads 74, 76 and 77. This alternator output bears a value which is directly proportional to the vehicle's actual speed. Therefore, when this is applied via the vehicle propulsion speed selection device 150 to the vehicle propulsion means 70 and the propulsion speed of propulsion motor 145 the vehicle speed is of course going to have removed therefrom the electrical braking brought about by the application of a negative incremental signal through the summation means 80 and the alternator 71 and its output. This might be described as an easing off of the deceleration of the vehicle in order that the predetermined value of deceleration not exceed that for which the system is ultimately designed.

As the vehicle decreases its speed to a point at which the authorized speed and the actual speed are equal, then of course the negative incremental signal and the neutral signal will no longer be called upon to subtract or to maintain a signal which will decelerate the vehicle to this new authorized speed. When this circumstance arises, the vehicle will be controlled exclusively by the authorized speed command signal which is manifested in the output from the alternator 32 and is present in the electrical leads 33, 34, and 36, which signal passes through the vehicle propulsion speed selection device 150 where it is employed by the propulsion motor 70 to drive the vehicle at the new authorized lower rate.

FIG. 1 also includes some additional brake control features which do not form an essential part of the invention to be described here. These means just noted include a brake control means 121 depicted directly beneath differential speed responsive device 51. This brake control means 121 is also controlled by the output 65 of the differential speed responsive device 51 and it will be seen that there is an electrical connection between the brake control means 121 and the primary vehicle acceleration and deceleration responsive means 127. This brake control means will be called into effect when the deceleration of the vehicle is at a relatively low rate as where the vehicle is being brought to a stop. The precise co-operation of this brake control means will be more readily appreciated when a study is made of FIGS. 2 and 3. It is sufficient to say at this point that the brake control means is called into effect to stop the vehicle only in the situation where safety demands that for some unexplained reason the use of the negative incremental signal from the incremental signal source 136 has been insufficient to provide the electrical braking to the propulsion motor to cause the vehicle to slow down without the application of the brakes.

FIG. 1 also includes a power control means 142, as well as a power supply 143. This power control means 142 delivers power to the inverter 155 and, as has been noted at the outset, whenever an authorized speed command signal appears in the rails 12 and 13 and is received by the vehicle-carried frequency detector 18, a signal will simultaneously appear on the leads 28 and 29 which will permit the power control means 142 to allow the passage of the direct current power from the power supply 143 to the inverter and in turn the propulsion motor 145. In the event that an authorized speed command signal being received by the vehicle-carried frequency detector 18 of the train 11 ceases, an essential fail-safe feature of the system brings the train to a halt because there will be no signal present in the electrical leads 28 and 29 of frequency responsive device 19, which in turn of course will cause the power control means 142 to open a circuit between the direct current power supply 143 to interrupt the delivery of power to the electrical lead 165 and thence to the inverter 155. The absence of a signal therefore interrupts the delivery of power to the propulsion motor 145 and the train can no longer receive driving power.

At this point in the description, brief mention will be made of the operation of the speed responsive clutch which transmits rotary motion from summation motor output shaft 99 to shaft 72. This speed responsive clutch includes an electromagnetic clutch which is controlled by the combined action of the differential speed responsive device 51 and the brake control means 121 via the electrical leads 37 and 38. The electromagnetic portion of the speed responsive clutch will always function when there is present a command to the vehicle which requires acceleration of the vehicle. A more detailed explanation of this aspect of the system will be made with reference to FIGS. 2 and 3.

Reference is now made to FIGS. 2 and 3 which set forth a preferred embodiment which illustrates a complete circuit diagram of a system embodying the invention.

FIGS. 2 and 3 taken together differ from FIG. 1 only in that many of the components designated in FIG. 1 shown in solid outlined block form are depicted in FIGS. 2 and 3 with a dotted outline surrounding the various actual components involved in each one of the FIG. 1 components. Accordingly, it will be seen that in FIG. 2 there is a vehicle 11 traveling along the rails 12 and 13 toward the variable frequency transmitter 14, which variable frequency transmitter 14 is delivering a vehicle speed command signal to the rails 12 and 13 via the electrical leads 16 and 17. The vehicle 11 carries a variable frequency detector 18. In actual practice this frequency detector may be comprised of a pair of coils mounted on the vehicle 11 in inductive relationship with the rails 12 and 13 to receive the signal from the variable frequency transmitter 14. While not depicted in this figure, the vehicle 11 would have wheels in contact with the rails 12 and 13 to form a completed circuit via the axle and the wheels in contact with the rails 12 and 13. Accordingly, the coils mounted on the vehicle, which form an integral part of the variable frequency detector 18 and which are not shown in this figure because they are conventional, would be positioned in front of the wheels of the vehicle and above the rails 12 and 13 to thereby inductively receive the variable frequency speed command signal from the transmitter 14, which signal is delivered via the electrical leads 21 and 22 to the frequency responsive means 19 shown here in dotted outline. This signal would be processed by a filter and demodulator which would extract only those signals which fell within the frequency range and modulation characteristic established for the system. These aspects of the signal are matters of design and for this reason no further detail will be given to a consideration of the various types of signals that may be delivered to the vehicle 11.

For purposes of going forward in a description of this embodiment of the invention it will be assumed, for purposes of explanation only, that the vehicle 11 will receive from the variable frequency transmitter 14 a signal that for example varies in frequency between 0 and 60 cycles per second with 60 cycles per second being equal to 60 miles per hour. It should be recognized of course that this frequency range is not intended to limit the scope of the invention but to provide a means of explaining this particular embodiment of the invention. Accordingly, this variable frequency signal delivered to the vehicle 11 is filtered and demodulated and an output from the filter and demodulator is delivered to a motor 27 via the electrical leads 23 and 24. The motor 27 is then driven at a rate which is directly proportional to the frequency of the signal delivered to the vehicle 11. The output which appears on the shaft 31 of the motor 27 will bear a rotational output which is directly proportional to the authorized speed command signal received by the vehicle 11. This rotary output which appears on the shaft 31 will in turn drive the authorized frequency responsive alternator 32 at a rate which is directly proportional to the authorized speed command signal delivered to the vehicle 11. As has been noted with reference to FIG. 1 this will produce an output signal on the electrical leads 33, 34 and 36 from the authorized frequency responsive alternator 32 and this signal will vary as a direct function of the authorized speed command signal delivered to the vehicle.

Extending to the right of the authorized frequency responsive alternator 32 the shaft 31 continues and enters the differential speed responsive device 51 shown in this figure in dotted outline. The differential speed responsive device 51 can include the following mechanism to provide an indication of differential speed to accomplish the desired function of this invention. Accordingly, the differential speed responsive device 51 includes an electromagnetic clutch 53, the source of power to the electromagnetic clutch 53 not being shown. When the shaft 31 is driven at a rate which is directly proportional to the authorized speed command signal, the electromagnetic clutch 53 will try to drive the differential speed responsive contact arm 54 in a direction determined by the rotary movement of the shaft 31. Opposing the rotary movement induced by the rotation of the shaft 31 is the rotary motion which is transmitted by a shaft 72, which in turn drives an electromagnetic clutch 73. The rotation of the shaft 72 is selected to be opposite to the direction of rotation of the shaft 31. As can be seen from this figure and from a study of FIG. 1, the shaft 72 passes through an alternator 71, a speed responsive clutch and thence to the summation means 80. It will be appreciated that in the event shaft 72 is rotating in an opposite direction from shaft 31, and reaches a speed which is equal to and opposite to the rotational speed of the shaft 31, the differential speed responsive contact arm 54 will remain in a central position as the two oppositely rotating shafts 31 and 72 will tend to balance each other's effect on this differential speed responsive contact arm 54. In the event that the rotary speed of the shaft 72 is less than the rotary speed of the shaft 31, which would occur when the authorized speed command signal is greater than the actual speed at which the vehicle is traveling, then the differential speed responsive contact arm 54 would move the contact arm 54 into contact with the acceleration contact 58 which would cause a circuit to be completed between the positive battery terminal, designated by the plus sign, the electrical lead 56, contact arm 54, the acceleration contact 58, electrical lead 61, and thence to the winding 63 of the relay 60 to the negative battery terminal. The energization of this winding 63 of the differential speed responsive relay 60 will cause the output 65 of the relay 60 to move to the right, and of course the contacts $a, b, c, d, e, f$ and $g$ of the differential speed responsive relay 60 to assume a position in contact with the normal contacts. In the event that the speed command signal and therefore the rotary motion of the shaft 31 is such that the rotational speed of the shaft 31 is relatively slower than the rotational speed of shaft 72, this will result in the differential speed responsive contact arm 54 being rotated in such a manner that the contact arm 54 comes in contact with the deceleration contact 57, which in turn will complete a circuit from the plus battery terminal, the electrical lead 56, the contact arm 54, deceleration contact 57, line 59, and winding 62 of the differential speed responsive relay 60, thereby causing the output 65 of the differential speed responsive relay 60 to move to the left causing the contacts $a, b, c, d, e, f$ and $g$ to assume a position in contact with the reverse contacts associated with the contacts $a$ through $g$. In the event that the rotational speed of the shaft 31 is indicative of the authorized speed command signal and the rotational speed of shaft 72 is equal and opposite, differential speed responsive contact arm 54 will maintain a neutral or a central position and it will not complete a circuit with either of contacts 57 or 58. Accordingly, the relay 60 will remain deenergized and circuits will be completed by the contacts $a, b, c, d, e, f$ and $g$ of the relay 60 over the resepective back contacts thereof.

The function of the alternator 71 will now be covered. The summation means 80 is shown in this figure in dotted outline. Directly above the summation means 80 there is positioned an actual vehicle velocity signal generating means 81 shown in dotted outline which includes an axle driven alternator 82 which will provide a signal which has a frequency directly proportional to the actual speed at which the vehicle is traveling. This signal will be delivered to the summation means 80 over the leads 83, 84 and 86. The summation means 80 includes a unique summation mechanism in the form of a summation motor 87. This summation motor 87 includes a stator winding 89 positioned within the motor casing 88. Summation motor 87 is unique in that it includes a pair of rotors 92, 98. A central rotor element designated as 98 is affixed to the shaft 99 which is mounted for rotation in the housing 88, and supported from this housing 88 by bearings 97 and 100 disposed on either side of the rotor 98. Disposed between the rotor 98 and the stator 89 is a special purpose rotor-stator arrangement which will now be described.

A rotatable element 91 is mounted for rotation within the casing 88 on bearing 100 which rests upon shaft 99 and also bearing 97, which bearing is mounted within the casing 88. The left-hand portion of the rotatable element 91 is mounted for rotation by a bearing 96 on the shaft 99. It will be appreciated that the rotatable element 91 can therefore rotate independently of the rotor 98 previously mentioned. Mounted on the rotatable element 91 is a set of rotor windings 92. This rotor winding 92 cooperates with the stator winding 89 to perform as a conventional motor. When stator 89 has impressed on it a multiphase variable frequency signal, a rotating electrical field appears in the stator 89, which rotating field causes the rotor 92 to follow the rotating field present in the stator 89. It will be appreciated that the rotatable element 91 and its related rotor 92 will be driven at a speed directly proportional to the signal delivered via the electrical leads 83, 84 and 86 from the axle driven alternator 81. Rotatable element 91 includes a stator element 93. This stator element 93 positioned within and between the rotor 92 and the rotor 98 is referred to here as a stator element for the following reasons. Even though the stator element 93 is affixed to a rotating member it will be seen that at the right-hand portion of the rotatable element 91 there are positioned a series of rings 101, 102 and 103 which make electrical contact with brushes 111, 112 and 113 which supply electrical energy to the rings 101, 102 and 103. Each of these rings is insulated one from the other and there emanates from each of the rings 101, 102 and 103 an electrical lead, not shown in detail here, which electrical lead passes through and into the stator winding 93. It will be appreciated that in the event a direct current signal is applied via the brushes 111, 112 and 113 there will be impressed upon the stator winding 93 a static magnetic field, which static or stationary field will cause the rotor 98 to remain stationary with respect to the static field in stator winding 93. Accordingly, the rotor 98 will move along with the rotatable stator 93 as the rotatable element 91 and its related rotor 92 are driven by the rotating electrical field in the stator 89. The stator 89 receives the variable frequency signal from the axle driven alternator 81. In this situation it will be appreciated that when a direct current signal is applied to the internal stator 93, the final output which appears in the shaft 99 will bear a direct relationship to the variable frequency signal delivered from the axle driven alternator 82. The shaft 99 and the rotor 98 will be driven at a speed proportional to the actual vehicle speed, and this will in turn be transmitted via the speed responsive clutch to the shaft 72 which drives alternator 71 to provide a variable frequency signal which is directly proportional to the axle driven alternator frequency signal delivered over the electrical leads 83, 84 and 86 to the stator of the summation motor 87.

Mounted on the casing 88 at the left-hand side of the summation motor 87 is an electromagnet that cooperates with an armature 41 mounted on rotor element 91. This electromagnetic brake arrangement is supplied direct current power whenever the vehicle is in the acceleration mode of operation and the vehicle is standing. That is to say this electromagnetic brake is applied whenever a speed commanded signal causes the differential speed responsive device 51 to reflect the need for the vehicle to accelerate and the centrifugal speed responsive switch and its contact *b* which is normally closed at speeds below 2 miles per hour is open. Whenever the vehicle speed is below 2 miles per hour, for example, the following circuit is completed between the positive battery terminal connected to contact *h* of the relay 60 and electromagnetic brake 40, 41. The circuit includes the positive battery terminal, normal contact *h* of relay 60, lead 37, back contact *b* of switch 122, lead 39, electromagnet 40 to the negative battery terminal. This braking of the rotor is essential during starting due to the fact that during starting of the vehicle no power is being delivered by axle driven alternator 82 to the stator 89. Thus, when a force is developed between winding 93 of motor 91 and rotor 98, the rotor 91 may rotate and the rotor 98 may remain stationary.

The output from the alternator 71 will appear on the electrical leads 74, 76 and 77. This description just made takes into account a situation which will be referred to hereafter as that condition which arises when a neutral signal is applied to the summation means 80. This designation of an application of a neutral signal to the summation means 80 and its related summation motor 87 is intended to convey the fact that a direct current signal has been placed upon internal stator 93.

There are two other dynamic situations which are contemplated in the mode of operation of this summation motor 87. They are as follows: In the event that there is a desire to drive the summation motor output shaft 99 at some incremental speed greater than the actual speed at which this shaft 99 would rotate in the presence of a neutral signal to the internal stator 93, the brushes 111, 112 and 113 will have applied thereto over the electrical leads 116, 117 and 118, in a manner to be described more fully hereafter, an incremental frequency signal. By this it is meant a signal which has the predetermined frequency of some programmed or preselected nature. This incremental frequency signal, when applied to the stator 93, in place of the neutral signal noted earlier, would in and of itself cause the rotor 98, assuming that the rotatable element 91 were held stationary, to rotate the rotor 98 at a speed proportional to the incremental frequency applied. It will be appreciated that since the rotatable element 91 is not held in a fixed position but is in fact driven as a function of the actual vehicle velocity as determined by the outputs from the variable frequency signal from the leads 83, 84 and 86, rotatable element 91 will be driven always at a speed directly proportional to the actual speed at which the vehicle is traveling.

In the situation which is now contemplated, the incremental frequency signal delivered to the stator 93 would then cause the stator 93 to be driven in a mechanical manner due to the presence of the rotating electromagnetic field in stator 89. As it will be appreciated, when this incremental frequency signal is applied to the stator 93 and the stator 93 is in turn mechanically rotated about the rotor 98, the cumulative effect will be to drive the rotor 98 as the algebraic sum of the variable frequency signal which has driven the rotatable element 91 and the incremental frequency delivered to the stator 93. In this situation the rotating electrical field which is present in the inner stator 93 is also mechanically rotated and of course will add, assuming the polarity applied is appropriate, this incremental frequency to the actual vehicle velocity frequency signal delivered to the stator 89. Accordingly, the output shaft 99 from the summation motor 87 will have a rotational output which bears a direct function to the sum of the actual speed the vehicle is traveling, and the preselected incremental value determined by the incremental signal source.

The next dynamic situation that may arise and which this summation motor 87 will experience comes about when the polarity of the incremental signal is reversed so that the rotating electrical field present in the stator 93 will tend to oppose the rotational movement induced by the rotating electrical field in the outer stator 89. In this situation, since the polarity of the incremental frequency signal delivered to the stator 93 via the brushes 111, 112 and 113 will be reversed, a subtraction of this incremental frequency will be manifested in a reduced rate of rotation of the rotor 98. That is, a reduced rotational rate of the rotor 98 in contrast to that situation where a neutral signal is applied to the stator 93.

It will be appreciated, therefore, that the description which follows will refer to the first situation described where a direct current signal is applied, as the application of a neutral signal.

Where an incremental frequency signal is delivered to the inner stator 93, which is of a polarity such that it is added to the frequency delivered from the axle driven alternator 82, this situation will be termed the application of a positive incremental signal.

Finally, where the polarity of the incremental signal delivered to the inner stator 93 opposes the mechanically induced rotating field effect brought about by the application of a variable frequency signal to the stator 89, this will be termed a negative incremental signal.

By way of review, it will be seen that the summation motor 87 has one continuous input in the form of a variable frequency signal from the axle driven alternator, which signal always bears a direct relation to the actual speed at which the vehicle is traveling. In addition, there are three distinctive situations which will affect the rotational output from the shaft 99. When there is a neutral signal applied to the internally driven stator 93, the rotor 98 and the shaft 99 will be driven at a rate directly proportional, and equivalent to the actual vehicle velocity. When a positive incremental frequency is delivered to the stator 93, this positive incremental frequency will be mechanically added to the frequency delivered from the axle driven alternator 82, and the rotational output from the shaft 99 will be such that the rotation rate will be greater than the actual speed at which the vehicle is traveling. Finally, when a negative incremental frequency is impressed upon the stator 93, this will have the effect of subtracting from the actual vehicle velocity frequency signal from the alternator 82 the incremental frequency signal and the output shaft 99 of the summation motor 87 will then have a rotational value somewhat less than the situation when the shaft 99 is driven at a speed directly proportional to the actual speed of the vehicle.

The above set of dynamic additions and subtractions from the actual vehicle speed as manifested by the change in rotational rate of the shaft 99 will be evidenced by a series of distinctive outputs which will be generated by the alternator 71. Accordingly, since the alternator 71 is driven by the shaft 72 via the speed responsive clutch and the shaft 99, the alternator 71 will produce a signal on the leads 74, 76 and 77 which is a measure of the algebraic sum of the signals delivered to the summation motor 87. This will mean that the alternator 72 will have a variable frequency output which is either directly proportional to the speed at which the vehicle is traveling or is of an incremental value greater than the actual speed at which the vehicle is traveling, or on the other hand is at an incremental value less than the actual speed at which the vehicle is traveling.

The electrical leads 74, 76 and 77 are each electrically connected to the vehicle propulsion speed selection device 150. The manner in which the signals that appear on electrical leads 74, 76 and 77 effect the control of the propulsion motor 145 will be explained in more detail hereafter.

It has been earlier mentioned that there will appear on the electrical leads 116, 117 and 118 and the brushes 111, 112 and 113, respectively, one of three possible types of signals; a neutral signal, a positive incremental frequency signal or a negative incremental frequency signal. The selection of these three possible signals is controlled by the switching or secondary vehicle acceleration and deceleration responsive means 120 shown here in dotted outline. It will be seen that these electrical leads 116, 117 and 118 enter the switching means 120 and the circuits which will be completed to these electrical leads will be made over the contacts b, c and d of the differential speed responsive relay 60. Positioned to the right in FIG. 3, shown in dotted outline, is the primary vehicle acceleration and deceleration responsive means 127 which includes an inertia responsive mechanism in the form of a pendulum 128, which pendulum 128 has a positive battery potential applied thereto. The inertia responsive function performed by the pendulum contact 128 controls the rate of acceleration or deceleration of the vehicle. The pendulum contact 128 is mounted on the vehicle and, of course, responds to any and all acceleration that the vehicle experiences in its forward travel along the rails.

It will be appreciated, of course, that the position the pendulum contact 128 assumes will be dependent upon the rate at which the vehicle is accelerating and this rate of vehicle acceleration will be determined by the weight of the load which the vehicle is carrying and whether or not the vehicle is required to accelerate to some predetermined authorized speed, or on the other hand to decelerate to some other predetermined authorized speed command level. In the event that the vehicle is traveling at a constant velocity, the pendulum contact 128 will maintain a neutral or downward position and will not make electrical contact with any of the contacts 125, 129, or 130 shown in the immediate vicinity of the pendulum contact 128.

For purposes of explanation and setting forth the circuit diagram here, the incremental signal source 136 shown in dotted outline, which includes the programmed incremental signal source 137 therein, has been shown located within the primary vehicle acceleration and deceleration responsive means 127. The programmed incremental signal source 137 has electrical leads 133, 134 and 135 which emanate therefrom.

The nature of this programmed incremental signal source 137 is of prime significance to this invention. Any of a number of different types of frequency generators may be employed to provide a constant frequency signal of some distinct increment. For example, keeping in mind that this system is hypothetically operating over a range of frequencies from 0 to 60 with regard to the authorized speed command signal and where 60 cycles per second represents 60 miles per hour and 30 cycles per second represents 30 miles per hour, the programmed incremental signal source will provide a frequency which is of a predetermined value which is determined by the nature of the system to which the acceleration and deceleration control system of this invention is to be applied.

It should be recognized that in the event that a full speed ahead command were to be received by a standing vehicle 11, for example, 60 cycles per second, and this 60 cycle signal were applied directly to the propulsion motor involved, there would be a tremendous acceleration within the propulsion motor of the vehicle which would produce on the one hand excessive slipping of the train wheels and therefore loss of tractive effort; and on the other hand, should the acceleration of the propulsion motor not be excessive with regard to tractive effort of the vehicle's drive wheels, then the acceleration experienced by the vehicle 11 may be excessive with regard to passenger comfort or the safe handling of freight cargo where freight trains are involved. On the other hand, should the signal delivered to the vehicle from the wayside go from the maximum authorized speed, hypothetically taken as 60 miles per hour represented by 60 cycles per second, to some lower speed, for example, 10 miles per hour which would be represented by an authorized speed command signal of 10 cycles per second, the propulsion motor of the vehicle would experience an electrical braking by the motor and this could produce excessing braking of the drive wheels which would result in a loss of braking effort because the wheels of the vehicle would begin to slide along the rails or the surface of the road. In the event that the wheels did not slide when an authorized speed command was delivered to the vehicle which was less than that at which the vehicle was actually traveling, the deceleration that would occur may well be inconsistent with the deceleration a passenger may comfortably experience while the vehicle was being slowed down. In a like manner too rapid a deceleration can cause damage to freight carried by the vehicles where freight vehicles are involved. This potential interference with safety and comfort of the passenger coupled with the loss of efficiency by loss of tractive effort in acceleration, or on the other hand the improper application of excessive deceleration are the factors that this system takes into account and for which a solution is provided.

Hypothetically speaking, it may be determined that a vehicle may only be accelerated, for example, at 2.7 miles per hour per second and that any acceleration in excess of this will produce an unwanted loss of tractive effort or induce passenger discomfort. If, for example, 2.7 miles per hour per second proves to be the optimum rate of acceleration, or deceleration, the incremental signal source 136 and the programmed incremental signal source 137 would have its output set to deliver incremental frequency of 2.7 cycles per second which, it will be appreciated, if delivered to the inner stator 93 of the summation motor 87 will produce an incremental increase depending upon the polarity of the incremental signal delivered. The rotary output of summation motor shaft 99 will reflect the incremental addition of 2.7 miles per hour per second to the actual speed at which the vehicle is traveling. Since the shaft 99 of the summation motor 87 drives an alternator 71, the output from the alternator 71 will have a characteristic which has the incremental frequency of 2.7 miles per hour per second added to the actual speed at which the vehicle is traveling.

It will be explained hereafter how this signal is applied to the propulsion motor of the vehicle, but at this point it will be appreciated that if the vehicle is traveling at some predetermined speed controlled by a signal which has an incremental value slightly greater than the actual speed at which the vehicle is traveling, then at no time will the possible loss of tractive effort or unwanted acceleration appear as a result of this signal being applied to the vehicle's propulsion motor.

In other words, the system contemplates the control of the propulsion motor in such a manner that the presence of an incremental signal added to or subtracted from a signal which bears a direct relationship to the actual speed of the train will control the acceleration or deceleration of the vehicle within the system designed limits consistent with safety and the optimizing of acceleration or deceleration. The precise manner in which this incremental signal is applied to bring about the acceleration or deceleration of the vehicle will be explained in more detail when a study is made hereafter of the typical functioning of the system which embodies this invention.

At this point it should be recognized that the programmed incremental signal source, while given a hypothetical value of 2.7 miles per hour per second and this translated into a frequency is 2.7 cycles per second, this incremental signal source may be varied depending upon the roadway conditions and the passenger or freight load of the vehicle controlled. It can be appreciated that where roadway conditions are more conductive to loss of tractive effort due to slipping of the propulsion drive wheels, then the incremental frequency should be selected of a value which will be different than where dry road conditions may exist. On the other hand, this incremental value may be changed to reflect the presence of a lightly loaded vehicle where few passengers or little freight is involved, or on the other hand the incremental value may be selected to be of a different value when the vehicle is fully loaded with passengers and/or freight. The control of the precise incremental value of the signal is not a part of this invention but it may be readily contemplated that once a system which is designed to utilize this invention has been studied there will appear a number of experimentally determined incremental values of acceleration or deceleration which may be called upon to optimize the vehicle's acceleration or deceleration, which incremental values of course will vary depending upon vehicle load and road conditions. Therefore, while this invention will be described hereafter with a static or a fixed incremental frequency signal used to explain the function of the related system apparatus, it is to be understood that the invention contemplates the fact that this incremental signal may be varied in a programmed manner which takes into account the variables just noted.

In FIG. 3, positioned beneath the incremental signal source 136 and as part of the primary vehicle acceleration and deceleration responsive means 127, there are a pair of relays AR and DR. The AR relay will be referred to as an acceleration relay and the DR relay as a deceleration relay. The pendulum contact 128 is movable to a series of poistions depending upon acceleration or deceleration of the vehicle. When the vehicle is accelerating from left to right, the pendulum contact 128 moves toward the left. In the event that the acceleration of the vehicle exceeds a predetermined rate, which of course is determined by the design of the pendulum and the distance the contact 129 is from the pendulum, the pendulum 128 will move over contact 129 which will complete a circuit from the positive battery terminal connected to the pendulum 128 through the contact 129, lead 131, relay AR, to a negative battery contact. When this occurs the relay AR will pick up and in picking up will interrupt the flow of incremental signal energy that is present on the leads 133, 134 and 135, which incremental frequency signal has been delivered over the back contacts a, b and c, respectively, of relay AR when it was deenergized. It will therefore be appreciated that the two following situations arise. When the acceleration of the vehicle, for example, is less than some predetermined value and the pendulum contact 128 has not moved over in contact with contact 129, there will be applied from the programmed incremental signal source 137, via the leads 133, 134 and 135, an incremental signal over the back contacts a, b and c of the relay AR, which incremental signal will be delivered to the switching or secondary vehicle acceleration and deceleration responsive means 120. The switching means 120 will control the application of this incremental signal via the contacts b, c, and d of the relay 60 to the electrical leads 118, 117 and 116, which in turn are connected to the summation motor 87. As has been noted, when the acceleration exceeds a predetermined rate, the pendulum 128 moves into contact with contact 129 and the relay AR is energized, thereby interrupting the delivery of the incremental signal and applying a direct current signal over the front contacts a, b and c of the relay AR. Accordingly, this direct current signal will be delivered to the switching or secondary vehicle acceleration and deceleration responsive means 120 where the application of this direct current signal, or as it is termed a neutral signal, will be controlled by the position of the contacts b, c and d of the relay 60.

It will be noted at this time that there is not depicted in this schematic diagram a neutral signal source per se but it is to be understood that since the neutral signal source in fact is a direct current signal the designation of plus and minus signs throughout this circuit diagram will be treated as adequately providing a showing of a neutral signal source.

In the event that the train is required to decelerate the pendulum contact 128 will move to the right and if the rate of deceleration exceeds the predetermined rate controlled by the design of the pendulum and the contacts, the pendulum contact 128 will come into electrical contact with contact 130 which will complete a circuit from the positive battery terminal through the pendulum contact 128, contact 130, lead 132, relay DR, and thence to a negative battery terminal. This will cause the energization of relay DR and will interrupt the application of an incremental signal which is normally applied over the electrical leads 133, 134 and 135, over the back contacts a, b and c of the relay DR to the switching or secondary vehicle acceleration and deceleration responsive means 120. It will be appreciated here that the electrical connection of the incremental signal source via the leads 133, 134 and 135 is varied by the physical positioning of the back contacts associated with the relays AR and DR to apply to the switching means 120 an incremental signal of opposite polarity. The selection of polarity is made by the back contacts of the AR and DR relays and the selection of an incremental signal of a positive or negative polarity to be delivered to the summation motor 87 will be controlled by the contacts b, c and d of the relay 60.

It will be recognized that the switching means 120 can therefore cause to be applied, depending upon the position of the output 65 from the differential speed responsive device 51, the application of either a positive or a negative incremental signal via the electrical leads 116, 117 and 118 to the summation motor 87. The switching means 120 also controls the application of a direct current or neutral signal source over the back contacts b, c and d of the relay 60 to the stator 93 of the summation motor 87. In the situation where the actual speed of the vehicle and the authorized speed commanded by the variable frequency transmitter has caused the vehicle to actually reach the authorized speed, then of course the output 65 from the differential speed responsive device 51 will be in its neutral position, and the contacts of the relay 60 will complete circuits over the back contacts of relay 60. When the neutral signal is applied to the inner stator 93, this will result in the rotor 98 of the summation motor and its related shaft 99 being driven at a rate directly proportional to the actual speed at which the vehicle is traveling.

Directly beneath the switching or secondary vehicle acceleration and deceleration responsive means 120 is the vehicle propulsion speed selection device 150 which has included therein the contacts e, f and g of the relay 60. These contacts e, f and g will permit the application of the authorized speed command frequency signal to be delivered via the electrical leads 33, 34 and 36 from the authorized frequency responsive alternator 32 to the inverter means 155 and the propulsion motor 145, when the output 65 of the relay 60 is in its neutral position. When the vehicle requires either an acceleration or a deceleration which is initially determined by the position of the output 65 of the relay 60, this will cause the contacts e, f and g to assume either an electrical contact with the normal or the reverse contacts. In either situation there will be applied the signal that is present on the leads 74, 76 and 77 which emanates from alternator 71 described earlier. This signal that appears on electrical leads 74, 76 and 77 will be one of three distinctive signals. The signal will be either of a plus nature in that it will include an increment of frequency which is essential for sufficient acceleration, or it will include a negative or minus frequency essential for sufficient deceleration, or thirdly there will be a neutral or actual vehicle speed frequency signal. One of these three distinctive signals will play a role in the control of the vehicle's acceleration or deceleration in a manner that will be appreciated more fully hereafter.

The vehicle propulsion speed selection device 150 has emanating therefrom electrical leads 151, 152 and 153, which leads are electrically connected to the contacts e, f and g of the relay 60 before noted. Over these leads 151, 152 and 153 there will be delivered a signal which will control the speed at which the propulsion system will operate. In this embodiment there has been selected the control of a propulsion motor 145, which propulsion motor is controlled as a direct function of the change in frequency of a multiphase signal delivered to the propulsion motor 145. This multiphase variable frequency signal which appears on the electrical leads 151, 152 and 153 controls the application of direct current power through an inverter means 155. The inverter means 155 includes a series of inverters 156, 157 and 158. Inverter 156 is connected to leads 151 and 152 by leads 159 and 160. Inverter 157 is connected to leads 151 and 153 by leads 163 and 164. Inverter 158 is connected to leads 152 and 153 by leads 161 and 163. The precise manner and operation of this inverter means 155, the direct current power supply 143 immediately beneath, and the power control means 142 has been explained in great detail in my copending application Ser. No. 492,008, above referred to, and a detailed explanation of the precise function of the inverter 155, the direct current power supply 143, and the power control means 142 will not be taken up here as the aforementioned application adequately explains the manner of operation of this aspect of the system.

It should be apparent that the power control means 142 which includes a relay PR is controlled by the application of energy through the electrical leads 28 and 29 which originated and emanated from the filter and demodulator 26 shown in FIG. 2. Only when a signal is being received by the vehicle 11 will a signal appear on the electrical leads 28 and 29, and as long as an authorized speed command signal is present, the relay PR of the power control means 142 will remain energized and the direct current power supply 143 will deliver direct current power via the electrical lead 144, the front contact a of relay PR, and common electrical lead 165 to each of the inverters 156, 157 and 158.

There remains to be described the brake control means 121 shown in dotted outline in FIG. 3. This brake control means is controlled as a combined function of the output 65 from the differential speed responsive relay 60 and the position of the pendulum contact arm 128 with reference to the contact 125, which contact 125 the pendulum contact 128 engages when the vehicle is decelerated. In those situations where the train is accelerating, or to say it another way, when the vehicle requires an acceleration, the output 65 from the differential speed responsive relay 66 will cause the contact a of the differential speed responsive relay 60 to complete a circuit with the normal contact a and energy will pass from positive battery terminal through the contact a of relay 60, the normal contact, and lead 126, to the electrical lead 114, through the brake relay BA to a negative battery terminal. This maintains the relay BA energized which therefore maintains the contact a of the relay BA picked up, which in turn permits the application of a battery potential across the brake system depicted here. The maintenance of this battery potential across the brakes keeps the brakes deenergized.

In the event that the vehicle is traveling at a constant velocity with no acceleration or deceleration, then an electrical circuit is completed when the output 65 from differential speed responsive relay 60 causes an electrical circuit to be completed over the back contact a, the electrical lead 115, the front contact a of centrifugal speed responsive device 122, through lead 114, and the brake relay BA, to a negative battery terminal. The centrifugal speed responsive device 122 maintains its front contact a closed at all vehicle speeds in excess of 5 m.p.h. The manner in which this speed responsive device cooperates with the rest of the system will not be set forth further as its function forms no part of the instant invention. It need only be recognized at this time that at all speeds above 5 miles per hour there is a circuit which is completed through brake application relay BA, which maintains the brakes deenergized, and therefore all vehicle deceleration control is brought about by the application of a positive or negative incremental signal as before noted.

When deceleration is called for and the output 65 of the differential speed responsive device 60 assumes a position to the left of that depicted in this figure, the circuit which includes the electrical lead 115 and the contact a of the centrifugal speed responsive device 122, as well as the brake application relay BA, will be interrupted. This, of course, would produce the deenergization of the brake application relay BA and the consequent release of this relay and the deenergization of the brake supply circuit with the contact a of relay BA open. This alone would, of course, apply the brakes to the vehicle. However, the application of the brakes is controlled in the following manner dependent upon the rate at which the vehicle is decelerating. It will be appreciated that when deceleration is called for the pendulum contact 128 will move to the right. As the pendulum 128 is moving to the right, a deceleration incremental frequency will be applied to the frequency propulsion motor 145 in a manner earlier described. In the event that this is sufficient, then the pendulum contact 128 which, upon moving to the right, will complete a circuit from the plus battery terminal through the pendulum contact arm 128, contact 125, electrical lead 124, electrical lead 114, relay BA to the negative battery terminal, and the relay BA will remain energized. If the rate of deceleration is not sufficient to maintain this pendulum arm 128 in a position to the right in contact with the contact 125, then the circuit between the pendulum contact arm 128 and the positive and negative battery terminals will be interrupted and the relay BA will be deenergized, thereby releasing the contact a of relay BA and interrupting the circuit which is supplying power to the brakes. This will produce an application of the brakes and a further deceleration of the vehicle. To the extent that the deceleration brought about by the application of the brakes is sufficient to cause an increase in the deceleration of the vehicle, the pendulum contact 128 will move to the right and in so doing restore the circuit between the positive battery terminal, pendulum contact arm 128, contact 125, electrical lead 124, lead 114, brake application relay BA, and the negative battery terminal, which will result in the energization of the relay BA and the picking up of relay BA's contact *a* thereby completing a circuit between the negative and positive battery terminals which maintains the brakes deenergized.

It will therefore be appreciated that the application of brakes in this system appears only in those situations where the deceleration rate brought about by the incremental signal source is insufficient to produce the desired deceleration rate for the vehicle. In those instances the brakes are applied only until the deceleration rate has been increased to a point where the deceleration brought about by electrical motor braking induced by the negative incremental signal is sufficient to maintain the desired rate of deceleration.

*Operation of the system in the acceleration mode*

When, for example, the vehicle 11 is standing in a station area and there has been received by the vehicle 11 a signal from the variable frequency transmitter 14, which is indicative of a need for full speed ahead operation, the following series of actions will occur within the system. In the instance where full speed ahead is equivalent to a 60 cycle per second signal delivered from the variable frequency transmitter 14 via the electrical leads 16 and 17 to the rails 12 and 13, the signal is detected by the frequency detector 18, and in turn the signal is translated via the electrical leads 21 and 22 to the frequency responsive means 19. This will result in the energization of the motor 27. The motor 27 is driven at a rate directly proportional to the 60 cycle per second signal and therefore the r.p.m. output which appears on the shaft 31 from the motor 27 will be indicative of the maximum authorized speed in this exemplary mode of the operation of the system. It is also to be recognized that the appearance of the signal command signal in the electrical leads 21 and 22 from the frequency detector 18 produces within the electrical leads 28 and 29, which emanate from the filter and demodulator 26, a signal which passes along the leads 28 and 29 to energize the relay PR in the power control means 142 which permits the passage of direct current power from the direct current power supply source 143 over the electrical lead 144, the front contact *a* of relay PR, to thereby provide energy to the inverters 156, 157 and 158 in a manner earlier described.

Returning now to the output which appears on the shaft 31. This rotary output is indicative of the authorized full speed ahead command and the authorized frequency responsive alternator 32 is driven at a rate which is directly proportional thereto. Appearing on the outputs 33, 34 and 36 of the authorized frequency responsive alternator 32 is an output which reflects the authorized speed command signal of 60 cycles per second, which in turn will pass along the electrical leads 33, 34 and 36 to the vehicle propulsion speed selection device 150 where it may be applied to the electrical leads 151, 152 and 153 which emanate from the vehicle propulsion speed selection device 150. This application of the authorized speed command signal from the speed selection means 150 will be made if the conditions are proper for the application of this authorized frequency signal to the inverter 155 and the vehicle propulsion motor 145. Presuming that the vehicle has been standing in the station, the rotary output of the shaft 31 which passes through the authorized frequency responsive alternator 32 will cause one half of the electromagnetic clutch 53 to rotate in a direction indicated by the arrow. This being the case, since the vehicle is at rest and the axle driven alternator 82 of the actual vehicle signal generating means 81 has an output on the leads 83, 84, and 86 indicative of a stationary vehicle, there will not be an output from the summation means 80 for there must be some signal to the stator 89 of the summation motor 87 before a rotary output will appear on the shaft 99 from the summation motor 87. Accordingly, there will be no output through the shaft 72 which drives one half of the electromagnetic clutch 73. This will cause the differential reaction of the differential contact arm 54 to bring the contact arm 54 into electrical connection with the acceleration contact 58. This completes a circuit between the plus battery terminal, electrical lead 56, contact arm 54, a contact 58, lead 61, winding 63 of the differential responsive relay 60, and finally the negative battery terminal. This causes the output of the differential responsive relay 60 to assume a position designated by the arrow marked acceleration and therefore the contacts *a*, *b*, *c*, *d*, *e*, *f* and *g* of the differential speed responsive relay 60 will assume a normal contact position. The positioning of these contacts of the differential speed responsive relay 60 will produce the following effect in the system.

Assuming now that the contacts *a* through *g* of the relay 60 are in their normal position, the following circuit paths will be completed to produce the desired acceleration rate according to the principles of this invention.

Looking at the primary vehicle acceleration and deceleration responsive means 127 and the incremental signal source 136 with its programmed incremental signal source 137 included therein, there is delivered from the programmed incremental signal source a constant delta incremental frequency signal over the electrical leads 133, 134 and 135. Since the pendulum contact 128 is in a neutral position because the vehicle is standing, there will be delivered via the back contacts *a*, *b* and *c* of the relay AR this incremental signal, which incremental signal will be passed over the electrical leads 42, 43 and 44, normal contacts *b*, *c* and *d* of the relay 60, leads 118, 117 and 116, brushes 111, 112 and 113 to impress upon the stator 93 of the rotatable member 91 the incremental signal.

Since there has been an authorized speed command signal delivered to the vehicle 11, there will be, as it can be appreciated, an authorized speed command signal delivered over the electrical leads 33, 34 and 36 to the speed selection switching device 150, which will at the instant of application of this authorized speed command signal permit the energization of the propulsion motor 145 through the inverter means 155 as when the contacts *e*, *f* and *g* of the relay 60 are in their neutral or center position. This means, of course, that the vehicle 11 will instantly start moving and as soon as the vehicle 11 is moving there will be an output from the axle driven alternator 82, which in turn will be impressed upon the stator 89 of the summation motor 87. This results in the driving of the rotor 92 as a direct function of the axle driven alternator frequency output, which in turn rotates the stator 93 which has impressed thereon the incremental signal just noted, which of course produces in the rotor 98 an output which is indicative of the sum of the frequencies delivered by the axle driven alternator 82 and the programmed incremental signal source 137. It follows, therefore, that the shaft 99 rotates at a speed which is the algebraic sum of the two just noted frequencies. This rotation is transmitted to the speed responsive clutch on the shaft 72 to the alternator 71 where a signal is generated which is directly proportional to the rotary input of the shaft 72. This summed signal passes over the leads 74, 76 and 77 to the speed selection device 150 where as it will be recalled, because the contacts *e*, *f* and *g* have moved to their normal position a circuit will be completed over the normal contacts *e*, *f* and *g* of the electrical leads 74, 76 and 77, respectively. This energy will pass thence over the electrical leads 151, 152 and 153 through the inverter means 155 and to the propulsion motor 145, which frequency responsive propulsion motor 145 will be driven as a direct function of this signal which includes the programmed incremental value. In other words, the signal received by the frequency responsive propulsion motor is in effect the algebraic sum of the actual speed of the vehicle plus some incremental signal which has been selected to complement the existing roadway conditions as well as passenger comfort and safety.

From what has been described so far it will be appreciated that if the acceleration continues as a result of the incremental frequency being added, the vehicle will eventually arrive at the authorized speed, at which time the rotary output from the summation means 80 via the shaft 99 will equal in r.p.m. the authorized speed commanded and then the differential speed responsive device with its contact arm 54 will assume a neutral position. Accordingly, there will cease to be applied to the propulsion motor 145 via the speed selection device the summation signal which includes the incremental frequency. In that instance, when the actual speed and the authorized speed are approximately equal, the relay 60 having assumed its neutral position, a circuit will be completed over the back contacts e, f and g of the relay 60 and the authorized command frequency will be delivered over these back contacts via the electrical leads 33, 34 and 36, and inverter means 155 to the frequency responsive propulsion motor 145.

What has just been described would be the ideal situation but as a practical matter it must be realized that the parameters involved are all changing in a dynamic manner, and therefore the incremental signal applied, which of course is selected in such a manner that the frequency responsive propulsion motor 145 will maintain maximum traction, may also provide an acceleration that, for some reason, is a little greater than that which is desired with reference to cargo safety and passenger comfort. In this event the pendulum contact 128 will swing to the left, as seen in this figure, presuming the vehicle is traveling to the right, in response to the acceleration brought about by the frequency responsive propulsion motor 145. Should the acceleration exceed that which has been designed into the system by the proportioning of the pendulum contact 128 and the relative position of the contact 129, the pendulum contact 128 will move to the left and contact contact 129. This will result in a completed circuit from the positive battery terminal, the pendulum contact 128, contact 129, lead 131, relay AR, to the negative battery terminal. This results in the energization of the relay AR and an interruption of the programmed incremental signal which is delivered over the leads 133, 134 and 135.

With this interruption of the incremental signal source there will be a simultaneous application of a neutral signal which will be delivered over the front contacts a, b and c of the relay AR. In this figure the neutral incremental signal source has not been shown but its presence is indicated by the notation of plus and minus signs indicative of the direct current signal applied to the front contacts a, b and c of the relay AR. This neutral signal is therefore applied via the electrical leads 42, 48 and 44 to the normal contacts b, c and d of the relay 60, electrical leads 118, 117 and 116, brushes 113, 112 and 111, and thence to the stator 93 of the rotatable element 91. When this occurs the direct current signal applied to the stator 93 will produce a stationary field which will cause the rotor 98 to rotate at the same rate of rotation that the rotatable element 91 is driven. In other words, the magnetic field induced by the neutral signal causes the rotor 98 and the rotatable element 91 to rotate in unison and this rotation will be manifested by an output seen on shaft 99 from the summation motor 87, which output is directly proportional to the actual speed at which the vehicle is traveling. This is so because the only signal which is now included in the output 99 of the summation motor 87 is that produced by the axle driven alternator 82. This will, of course, produce an output from the alternator 71 which is carried via the leads 74, 76 and 77 to the vehicle speed selection device 150, whereas it will be recalled the contacts e, f and g of the relay 60 are in their normal position and then this actual vehicle frequency signal will be applied through the leads 151, 152 and 153, inverter means 155, and thence to the frequency responsive propulsion motor 145. This of course will produce a decrease in the rotary output of the propulsion motor in contrast to that situation where the incremental signal was present and added to the actual speed signal. This will produce an electric motor braking vehicle form of retardation of the vehicle which will cause a deceleration and the vehicle will assume a speed which is commensurate with that designed into the system. In other words, the moment the rate of deceleration is such that the designed parameters of the system have been met, the pendulum contact 128 will move from its leftward position in engagement with contact 129 to a position intermediate the neutral position and contact 129. This will again permit the passage of the programmed incremental signal over the back contacts a, b and c of the relay AR which will produce, in the same manner as that described before, the application of a summed signal to appear on the output shaft 99 in rotary form. This again will cause a summed actual vehicle and incremental signal frequency to be applied via the leads 73, 74 and 77 from the alternator 71 and this summed signal, in the manner described earlier, will of course produce another incremental acceleration of the frequency responsive propulsion motor.

*The deceleration mode of operation of the system*

Where the vehicle is traveling at the authorized speed and the road conditions require, or in the alternative, the traffic conditions are such that deceleration is called for by the system, this deceleration mode of operation will occur.

As has been noted, with the vehicle operating at its full speed ahead, or in this example where the authorized speed command signal from the variable frequency transmitter 14 delivered to the rails 12 and 13 by leads 17 and 18 is a speed command signal of 60 cycles per second, any reduction in speed for the vehicle will require a decrease in the frequency of the authorized speed command signal delivered to the vehicle 11. For example, if the authorized speed were reduced to 10 cycles per second indicative of 10 miles per hour, the following would occur. Upon the receipt of the 10 cycle per second signal the vehicle-carried frequency detector 18 would deliver this signal via the leads 21 and 22 to the frequency responsive means 19 where it would be filtered and demodulated by the filter and demodulator 26, and this signal in turn would be delivered via the leads 23 and 24 to the motor 27, which motor 27 would be driven at a rate proportional to the 10 cycle per second command signal and the output shaft 31 would be rotated at a rate proportional to the 10 cycles per second which is equivalent to the 10 miles per hour speed command. This would produce an output from the authorized frequency responsive alternator 32 over the leads 33, 34 and 36, which authorized frequency command signal would be delivered to the speed selection device 150 to be utilized in a manner to be described hereafter.

The output shaft 31, which drives one half of the electromagnetic clutch 53, would of course be driving one half of the electromagnetic clutch at a rate equivalent to the authorized speed command signal of 10 cycles per second or 10 miles per hour. It should be kept in mind that the vehicle is traveling at full speed ahead, namely, 60 miles per hour, and the shaft 72 which is driven through the speed responsive clutch and the shaft 99 is turning at a rate which is directly proportional to the actual speed of the vehicle or 60 miles per hour. The rotation of this shaft is in the direction of the arrow shown and since this rotation is opposite to the rotation of shaft 31 the differential speed responsive device 51 and the related contact arm 54 will move into electrical contact with the deceleration contact 57. This will therefore complete a circuit between the positive battery terminal, lead 56, contact arm 54, contact 57, lead 59, winding 62, and finally the negative battery terminal. This will cause the output 65 of the differential speed responsive relay 60 to assume its reverse position and the contacts a, b, c, d, e, f and g will assume the reverse position which will result in the following mode of operation within the system.

During the brief space of time between the instant when the vehicle is traveling at the authorized speed commanded, in this instance full speed ahead, and that instant when the vehicle enters the deceleration mode, there will be an inherent decrease in the speed of the vehicle 11. This decrease in speed is accompanied by the simultaneous deceleration of the vehicle. This instantaneous appearance of deceleration once the full speed ahead command signal is removed from the frequency responsive motor will cause the pendulum contact 128 in the primary vehicle acceleration and deceleration responsive means 127 to move slightly to the right, and in so doing come in contact with the contact 125. This completes a circuit between the positive battery terminal, pendulum contact 128, contact 125, lead 124, relay BA and the negative battery terminal. This completed circuit will keep relay BA in a picked-up condition with contact $a$ completing a circuit over the front contact $a$ so that the brake circuit remains energized and the brakes stay in a released position. Therefore, as the vehicle is entering this deceleration mode of operation the pendulum contact 128 assumes a position slightly to the right and in contact with the contact 125. Simultaneously with the positioning of the pendulum contact 128 in the position just noted there will be an application of an incremental signal from the programmed incremental signal source 137 via the leads 133, 134 and 135 to the following back contacts, respectively, $b$, $a$ and $c$ in that order of the relay DR and this incremental signal will be transmitted along the electrical leads 45, 46 and 47 to the switching or secondary vehicle acceleration and deceleration responsive means 120.

It will be noted at this time that the polarity of the programmed incremental signal is different from that which was called into play when the vehicle and the system were in the acceleration mode of operation. This may be termed as a reversing of the polarity of the incremental signal source, or in the alternative, the providing of a negative incremental signal, which will have an effect which will be explained more fully hereafter.

The negative incremental signal which is applied via the leads 45, 46 and 47 to the switching or secondary vehicle acceleration and deceleration responsive means 120 will pass over the reverse contacts $b$, $c$, and $d$ of the differential speed responsive relay 60 to the electrical leads 118, 117 and 116, brushes 113, 112 and 111, to stator 93 mounted on the rotatable element 91. This will impress upon the stator 93 a rotating electromagnetic field whose polarity and electric field rotation oppose the direction of rotation of the rotatable element 91 which of course is driven in a direction determined by the rotating field present in the stator 89 of the summation motor 87. It will be appreciated therefore that the output from the summation motor 87, as evidenced by the rotation of the shaft 99, will bear the algebraic sum of the several imputs to the summation motor, namely, the negative incremental signal provided from the programmed incremental signal source will be subtracted from the signal which is delivered from the axle driven alternator 82. In other words, the output shaft 99 will have a rotational output which is indicative of a frequency which is somewhat less than the actual frequency generated by the axle driven alternator 82. Since this output from shaft 99 is translated directly through the speed responsive clutch and shaft 72, the alternator 71 will produce a proportional output over the leads 74, 76 and 77 to the speed selection device 150. Since the output from the differential speed responsive relay 60 is to the left or reverse position, the summed signal which appears on the leads 74, 76 and 77 will be applied over the reverse contacts $e$, $f$ and $g$ to the leads 151, 152 and 153, respectively, which leads enter the inverter 155 and drive the frequency responsive propulsion motor 145 at a rate directly dependent upon the frequency of the signal received by the motor. This of course will produce an electric braking in the motor 145 because the frequency of the signal received by the frequency responsive propulsion motor 145 is less than the actual speed at which the vehicle is traveling. This will produce a deceleration. To the extent that the deceleration is adequate and the vehicle continues to decelerate at the constant incremental signal value, the vehicle will eventually reduce its speed to that which equals the authorized speed command signal. In that eventuality the output from the summation motor 87 will be such that the rotation of the shaft 99, as well as the shaft 72, will be equal and opposite to the rotational input delivered by the shaft 31 to the other side of the differential speed responsive device 51. In this instance, the contact arm 54 will assume a neutral position and the relay 60 will assume a neutral position producing the following speed command circuit to the propulsion motor 145.

Since the output 65 is in its neutral position the authorized frequency responsive alternator 32 and its output over the leads 33, 34 and 36 will be delivered over the back contacts $e$, $f$ and $g$ of the relay 60 to the leads 151, 152 and 153, to the inverter means 155, and thence to the frequency responsive propulsion motor 145, which will therefore continue to drive the vehicle at a speed commensurate with the authorized speed command signal of 10 cycles per second or, in other words, 10 miles per hour.

In the event that the deceleration exceeds the designed permitted deceleration, the pendulum contact arm 128 will move farther to the right and in so doing contact the contact 130 completing the following circuit from the positive battery terminal, the pendulum contact 128, contact 130, lead 132, relay DR, to the negative battery terminal. When this occurs the programmed incremental signal source will have its delivery of energy interrupted as this relay DR picks up and there will then be applied over the front contacts $a$, $b$ and $c$ of the relay DR the neutral signal, or direct current signal as depicted here, which will produce a braking action relative to the rotor 98 and the stator 93. In other words, the completion of the circuit over the front contacts $a$, $b$ and $c$ of the relay DR will apply a direct current signal over the front contacts $a$, $b$ and $c$, the leads 45, 46 and 47, the reverse contacts $b$, $c$ and $d$ of relay 60, leads 118, 117 and 116, brushes 113, 112 and 111, to the stator 93. This will result in the rotor 98 being driven at a rate directly proportional to the output delivered by the axle driven alternator 82. It will be recalled, since the vehicle is in a deceleration mode, this output has a greater frequency than in that situation where the incremental signal is subtracted. In other words, the rotation of shaft 99 will increase its relative speed and in so doing increase the rate of rotation of the shaft 72 and the consequent output of the alternator 71, which increased alternator output appears on the leads 74, 76 and 77, which signal in turn is delivered to the speed selection device 150. This increased signal indicative of the actual speed of the vehicle passes over the reverse contacts $e$, $f$ and $g$, leads 151, 152 and 153, to the inverter means 155, and finally to the frequency responsive propulsion motor 145 which in effect eases up the deceleration rate by permitting the frequency responsive propulsion motor to receive a signal which is indicative of the actual speed of the vehicle.

It will therefore be appreciated that since the deceleration rate is altered by the application of a signal which is indicative of the acutal speed of the vehicle, the pendulum contact 128 will move down and to the left away from the contact 130, thereby bringing back into effect the programmed incremental signal source in a manner described earlier. This action will continue until the output from the summation motor in terms of rotation of the shaft 99 and rotation of the shaft 72 is equal and opposite to the rotation of the shaft 31. When this occurs the output from the differential speed responsive device 51 will be in its neutral or center position producing no output from the differential speed responsive relay 60, and the signal which drives the vehicle's propulsion motor will be delivered over the back contacts *e*, *f* and *g* of the relay 60 from the authorized frequency responsive alternator 32 via the leads 33, 34 and 36 in the same manner that has been described earlier. It will therefore be appreciated that as the vehicle decelerates upon the intermittent application of the incremental signal source the vehicle will eventually attain the authorized speed of 10 miles per hour, while maintaining the maximum deceleration rate permissible.

It may now be stated by way of recapitulation that in either the acceleration or the deceleration mode of operation the output from the differential speed responsive relay 60 will assume either its normal position when acceleration is called for, or the reverse position when deceleration is called for, and this condition, either normal or reverse, will be maintained until the presence of the incremental signal source and its application have either increased the vehicle speed to the command speed, and in the situation where deceleration is called for the vehicle has decelerated to a speed which equals the authorized speed commanded from the wayside.

*Braking and bringing the vehicle to a halt*

The precise manner of bringing the vehicle to an actual physical halt is not part of the invention being described here. All that need be said in this application at this time is that the speed responsive clutch that is presently located between the shaft 72 and the shaft 99 is a clutch which releases whenever the actual speed of the shaft 99 is equal to, for example, 5 miles per hour. In other words, the proportional rotational speed of the shaft 99 approximates the speed of the vehicle when it is traveling at 5 miles per hour. When this occurs the speed responsive clutch disengages and then the only effect left is that of the inertia present in the clutch housing and the associated flywheel, which of course is not shown in detail here. When the vehicle has reached 5 miles per hour, the authorized command frequency delivered from the wayside is cut off in a manner not shown here. With the removal of the authorized command frequency signal no output is delivered from the authorized frequency responsive alternator 32, and therefore the speed selection device 150 cannot pass any signal from the authorized frequency responsive alternator 32. The only signal that appears left in the system which may be utilized to drive the frequency responsive propulsion motors is that frequency which will be present in the outputs 74, 76 and 77 from the alternator 71. This output will appear for a brief moment of time after the speed responsive clutch has released and the time duration of this signal of decreasing frequency will be measured by the time which it takes for the speed responsive clutch to slowly decelerate by its own inertia to zero. It will therefore be appreciated that the final deceleration of the vehicle will be controlled by the output from the alternator 71 whenever the vehicle speed falls below 5 miles per hour. This decreasing frequency signal delivered over the leads 74, 76 and 77 will pass through the speed selection device 150, over the reverse contacts *e*, *f* and *g* of relay 60, and thence through the leads 151, 152 and 153, inverter means 155, and finally drive the frequency propulsion motor 145 at a decreasing rate dependent upon the rate at which the frequency is falling off due to the slowing down of the speed responsive clutch mechanism.

Normally, the pendulum contact 128 which is moved to the right when the vehicle is in the deceleration mode of operation and the pendlum contact 128 which is in contact with the contact 125 maintains the brake circuit energized. In the event that the deceleration rate is inadequate the pendulum contact 128 will move downward and away from the contact 125. The circuit between the positive battery terminal source and the negative battery terminal source, through the pendulum contact arm 128, contact 125, lead 124, relay DA, will then be interrupted and the relay DA deenergized, thereby opening the brake circuit which would in turn cause the brakes to be applied. In the ideal environment this application of the brakes would only occur in an emergency situation with the vehicle normally being decelerated to a halt without the vehicle ever experiencing the application of the conventional braking system.

It goes without saying that the relay PR of the power control means 142 would have to be of a slow to release type in order that the contact *a* of the relay PR remain in its upper position, completing a circuit over the front contact *a* of the relay PR until the predetermined time which the vehicle is expected to take in decelerating to a stop has lapsed, at which time this relay PR would drop and the direct current power supply 143 would be interrupted in the delivery of power to the inverter means 155.

It will therefore be appreciated that the system contemplates a number of fail-safe features with reference to the braking and final deceleration of the vehicle to a stop.

In all cases, if the braking or deceleration rate is insufficient, whether it be due to the fact that the incremental signal is insufficient, or whether the deceleration brought about by the alternator output when the vehicle is below 5 miles per hour is of an insufficient rate, then the pendulum contact 128 will move away from the contact 125, thereby opening the brake energization circuit and applying the auxiliary brakes. This is a further feature which enhances the fail-safe capabilities of this system in that should there be a removal of a command signal from the vehicle, this would result in an interruption of the direct currrent power supply to the propulsion motor, thereby interrupting the operation of the motor which of course in turn will produce the desired application of the brakes due to the fact that the vehicle will not be decelerating at the designed rate set for the system.

While the present invention has been illustrated and disclosed in connection with the details of illustrative embodiments thereof, it should be understood that those are now intended to be limitative of the invention as set forth in the accompanying claims.

Having thus described my invention, what I claim is:

1. A vehicle propulsion velocity rate of change control system wherein a vehicle has a propulsion means controlled as the combined function of an authorized speed command signal delivered to said propulsion means and a signal from a programmed velocity rate of change signal source, said velocity rate of change signal source controlled by means that measure the actual rate at which said vehicle is responding to said authorized speed command signal to thereby provide said velocity rate of change signal, to add to, to subtract from, or to maintain said actual rate at which said vehicle is responding to said authorized speed command signal, said programed velocity rate of change signal has a value which is consistent with vehicle safety, roadway conditions and passenger comfort.

2. A vehicle propulsion velocity rate of change control system wherein said vehicle's speed is controlled as a combined function of an authorized speed command signal and the rate at which said vehicle is responding to said authorized speed command signal, said system including:
   (a) a differential speed responsive device having an output and at least one input which is a direct function of said authorized speed command signal,
   (b) a summation means,
   (c) means responsive to said vehicle's velocity rate of change to provide either an incremental signal output or a neutral signal output,
   (d) an actual vehicle velocity signal generating means having an output to said summation means,
   (e) switching means controlled by said output of said differential speed responsive device to apply to said summation means said incremental signal output or said neutral signal output,
    (1) said summation means having an output which is indicative of the algebraic sum of said actual vehicle velocity signal input and said incremental signal or neutral signal input,
    (2) said output of said differential speed rseponsive device is a function of said authorized speed command signal and said summation means output,
(f) a vehicle propulsion means speed selection device controlled by said output of said differential speed responsive device,
    (1) said controlled propulsion means speed selection device having an output which is a function of either said authorized speed command signal or said summation means output,
(g) vehicle propulsion means controlled by said output from said speed selection device.

3. The vehicle propulsion velocity rate of change control system of claim 2 wherein said means responsive to said vehicle's velocity rate of change includes an inertia responsive means which assumes a series of positions dependent upon whether said vehicle is accelerating, decelerating, or traveling at a constant velocity.

4. The vehicle propulsion velocity rate of change control system of claim 3 which includes an incremental signal source which provides a signal having an incremental value of a positive nature where acceleration is required and a signal having an incremental value of a negative nature where deceleration is required.

5. The vehicle propulsion velocity rate of change control system of claim 4 wherein said incremental value is programmed to be consistent with safety and passenger comfort.

6. The vehicle propulsion velocity rate of change control system of claim 4 wherein said incremental value is programmed to provide an optimum tractive effort dependent on roadway conditions, when propulsion drive is obtaind via driving means in contact with said roadway.

7. The vehicle propulsion velocity rate of change control system of claim 4 wherein said incremental signal source is controlled by said position of said inertia responsive means so that whenever said rate of change of velocity exceeds either a predetermined acceleration or deceleration rate, respectively, said positive or negative incremental signal to said switching means is interrupted.

8. The vehicle propulsion velocity rate of change control system of claim 7 which includes a neutral signal source responsive to said positions of said inertia responsive means to provide said neutral signal to said switching means whenever said acceleration or deceleration has exceeded said predetermined acceleration or deceleration rate.

9. The vehicle propulsion velocity rate of change control system of claim 8 wherein said switching means applies said incremental signal and said neutral signal to said summation means when the following conditions respectively arise:
    (1) when said vehicle requires acceleration or deceleration to maintain said authorized speed commanded, then a positive or negative incremental signal is applied to said summation means as well as said neutral signal dependent upon the control effected by said inertia responsive means,
    (2) said neutral signal source also applied to said summation means whenever said authorized speed and said actual speed are approximately equal.

10. The vehicle propulsion velocity rate of change control system of claim 8 wherein:
(a) said authorized speed command signal selection made by said vehicle propulsion means speed selection device occurs when
    (1) said vehicle's actual speed and said command speed are approximately equal,
(b) said summation means output is selected when
    (1) said differential speed responsive device output is indicative of the need for either acceleration or deceleration in order for said vehicle to attain said authorized speed commanded.

11. The vehicle propulsion velocity rate of change control system of claim 10 wherein said differential speed responsive device output is indicative of whether the vehicle must be accelerated or decelerated to thereby arrive at said authorized speed.

12. The vehicle propulsion velocity rate of change control system of claim 11 wherein said vehicle includes means to receive said authorized speed command signal which is transmitted to said vehicle from a remote point.

13. A vehicle propulsion velocity rate of change control system wherein said vehicle's speed is controlled as a combined function of an authorized speed command signal and the rate at which said vehicle is responding to said authorized speed command signal, said system including:
(a) a differential speed responsive device having an output and at least one input which is a direct function of said authorized speed command signal,
(b) a summation means,
(c) a primary vehicle velocity rate of change responsive means having an output,
(a) a secondary vehicle velocity rate of change responsive means controlled by said output from said differential speed responsive device,
(e) an actual vehicle velocity signal generating means having an output to said summation means,
(f) an incremental signal source controlled by said output from said primary vehicle velocity rate of change responsive means, said incremental signal source electrically connected to said secondary vehicle velocity rate of change responsive means,
(g) a neutral signal source controlled by said output from said primary vehicle velocity rate of change responsive means, said natural signal source electrically connected to said secondary vehicle velocity rate of change responsive means,
(h) said secondary vehicle velocity rate of change responsive means controlling the application of said incremental signal or said neutral signal to said summation means,
    (1) said summation means having an output which is indicative of the algebraic sum of said actual vehicle signal input and, said incremental signal or said neutral signal input,
    (2) said output of said differential speed responsive device is a function of said authorized speed command signal and said summation means output,
(i) a vehicle propulsion means speed selection device controlled by said output of said differential speed responsive device,
    (1) said propulsion means speed selection device having an output which is a function of either said authorized speed command signal or said summation means output,
(j) vehicle propulsion means controlled by said output from said speed selection device.

14. The vehicle propulsion velocity rate of change control system of claim 13 wherein said primary vehicle velocity rate of change responsive means includes an inertia responsive means which assumes a series of positions dependent upon whether said vehicle is accelerating, decelerating, or traveling at a constant velocity.

15. The vehicle propulsion velocity rate of change control system of claim 14 wherein said incremental signal sources provides a signal having an incremental frequency value of a positive nature where acceleration is required and a signal having an increment frequency value of a negative nature where deceleration is required.

16. The vehicle propulsion velocity rate of change control system of claim 15 wherein said incremental frequency value is programmed to be consistent with safety and passenger comfort.

17. The vehicle propulsion velocity rate of change control system of claim 15 wherein said incremental frequency value is programmed to provide an optimum tractive effort dependent on roadway conditions when propulsion drive is obtained via driving wheels in contact with said roadway.

18. The vehicle propulsion velocity rate of change control system of claim 14 wherein said incremental signal source is controlled by said position of said inertia responsive means so that whenever said rate of change of velocity exceeds either a predetermined acceleration rate, or deceleration rate, respectively, said positive or negative incremental frequency signal to said secondary vehicle velocity rate of change responsive means is interrupted.

19. The vehicle propulsion velocity rate of change control system of claim 18 wherein said neutral signal source is controlled by said positions of said inertia responsive means to provide said neutral signal to said secondary vehicle velocity rate of change responsive means whenever said acceleration or deceleration has exceeded said predetermined acceleration or deceleration rate.

20. The vehicle propulsion velocity rate of change control system of claim 19 wherein:
 (a) said secondary vehicle velocity rate of change responsive means applies said incremental frequency signal and said neutral signal when the following conditions respectively arise,
  (1) when said vehicle requires acceleration or deceleration to maintain said authorized speed commanded, then positive or negative incremental frequency signal is applied to said summation means as well as said neutral signal dependent upon control effected by said inertia responsive means,
  (2) said neutral signal source also applied to said summation means whenever said authorized speed and said actual speed are approximately equal.

21. The vehicle propulsion velocity rate of change control system of claim 20 wherein said actual vehicle velocity signal generating means produces a signal whose frequency varies as a function of said vehicle's actual velocity.

22. The vehicle propulsion velocity rate of change control system of claim 21 which includes a variable frequency generator having a variable frequency output controlled by said summation means output,
 said variable frequency output delivered to vehicle propulsion means speed selection device.

23. The vehicle propulsion velocity rate of change control system of claim 22, wherein:
 (a) said authorized speed command signal has a frequency which varies as a function of the authorized vehicle velocity command.

24. The vehicle propulsion velocity rate of change control system of claim 23 wherein:
 (a) said authorized speed command signal selection made by said vehicle propulsion means speed selection device occurs when
  (1) said vehicle's actual speed and said command speed are approximately equal,
 (b) said summation means output is selected when
  (1) said differential speed responsive device output is indicative of the need for either acceleration or deceleration in order for said vehicle to attain said authorized speed commanded.

25. The vehicle propulsion velocity rate of change control system of claim 24 wherein said differential speed responsive device output is indicative of whether the vehicle must be accelerated or decelerated to thereby arrive at said authorized speed.

26. The vehicle propulsion velocity rate of change control system of claim 25 wherein said vehicle includes means to receive said authorized speed command signal which is transmitted to said vehicle from a remote point.

27. A vehicle propulsion velocity rate of change control system wherein said vehicle's speed is controlled as a combined function of an authorized speed command signal and the rate at which said vehicle is responding to said authorized speed command signal, said system including:
 (a) a differential speed responsive device having an output and at least one input which is a direct function of said authorized speed command signal,
 (b) a summation means,
 (c) a primary vehicle velocity rate of change means having an output,
  (1) said primary vehicle velocity rate of change responsive means including an inertia responsive means which assumes a series of positions dependent upon whether said vehicle is accelerating, decelerating, or traveling at a constant velocity,
 (d) a secondary vehicle velocity rate of change responsive means controlled by said output from said differential speed responsive device,
 (e) an actual vehicle velocity signal generator having an output to said summation means,
 (f) an incremental signal source controlled by said output from said primary vehicle velocity rate of change responsive means, said incremental signal source electrically connected to said secondary vehicle velocity rate of change responsive means,
  (1) said incremental signal source having a programmed incremental value of a positive nature where acceleration is required and said incremental signal having a negative nature where deceleration is required,
  (2) said incremental signal soruce controlled by said position of said inertia responsive means so that whenever said rate of change of velocity exceeds either a predetermined acceleration rate or deceleration rate, respectively, said positive or negative incremental natured signal to said secondary vehicle velocity rate of change responsive means is interrupted,
 (g) a neutral signal source controlled by said output from said primary vehicle velocity rate of change responsive means, said neutral signal source electrically connected to said secondary vehicle velocity rate of change responsive means,
  (1) said primary velocity rate of change responsive means output which controls said neutral signal source and which is in turn controlled by said position of said inertia responsive means provides said neutral signal to said secondary vehicle velocity rate of change responsive means whenever said acceleration or deceleration has exceeded said predetermined acceleration or deceleration rate,
 (h) said secondary vehicle velocity rate of change responsive means controlling the application of said incremental signal or said neutral signal to said summation means,
  (1) said summation means having an output which is indicative of the algebraic sum of said actual vehicle velocity signal input and, said incremental signal or said neutral signal input,
  (2) said output of said differential speed responsive device is a function of said authorized speed command signal and said summation means output,
 (i) a vehicle propulsion means speed selection device controlled by said output of said differential speed responsive device,
  (1) said propulsion means speed selection device having an output which is a function of either said authorized speed command signal or said summation means output,
(j) vehicle propulsion means controlled by said output from said speed selection device.

References Cited

UNITED STATES PATENTS 3,304,421  2/1967  Wright  246—187 XR

ARTHUR L. LA POINT, *Primary Examiner.*

S. T. KRAWCZEWICZ, *Assistant Examiner.*

PO-1050
(5/69)

UNITED STATES PATENT OFFICE
CERTIFICATE OF CORRECTION

Patent No. 3,395,275　　　　　　　Dated　July 30, 1968

Inventor(s)　George W. Baughman

It is certified that error appears in the above-identified patent and that said Letters Patent are hereby corrected as shown below:

Column 31, line 40, "obtaind" should be --obtained--. Column 32, line 29, "(a)" should be --(d)--; line 41, "natural" should be --neutral--; line 50, after "vehicle" insert --velocity--; line 74, "sources" should be --source--. Column 34, line 41, "soruce" should be --source--.

SIGNED AND
SEALED

SEP 9 - 1969

(SEAL)
Attest:

Edward M. Fletcher, Jr.
Attesting Officer

WILLIAM E. SCHUYLER, JR.
Commissioner of Patents